United States Patent
Komura et al.

(10) Patent No.: US 8,045,422 B2
(45) Date of Patent: Oct. 25, 2011

(54) NEAR-FIELD LIGHT GENERATING ELEMENT COMPRISING SURFACE PLASMON ANTENNA AND WAVEGUIDE WITH GROOVE

(75) Inventors: Eiji Komura, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 381 days.

(21) Appl. No.: 12/349,956

(22) Filed: Jan. 7, 2009

(65) Prior Publication Data
US 2010/0172220 A1 Jul. 8, 2010

(51) Int. Cl.
*G11B 11/00* (2006.01)

(52) U.S. Cl. .................. 369/13.33; 369/112.27

(58) Field of Classification Search .............. 369/13.24, 369/13.33, 13.32, 13.13, 13.02, 112.27; 360/59, 360/128, 245.3; 427/123, 125
See application file for complete search history.

(56) References Cited

U.S. PATENT DOCUMENTS

| | | | |
|---|---|---|---|
| 6,768,556 B1 | 7/2004 | Matsumoto et al. | |
| 7,330,404 B2 | 2/2008 | Peng et al. | |
| 7,454,095 B2 * | 11/2008 | Baehr-Jones et al. | 385/14 |
| 2003/0066944 A1 | 4/2003 | Matsumoto et al. | |
| 2004/0081031 A1 | 4/2004 | Saga et al. | |
| 2005/0249451 A1 | 11/2005 | Baehr-Jones et al. | |
| 2010/0149930 A1* | 6/2010 | Komura et al. | 369/13.33 |
| 2010/0238580 A1* | 9/2010 | Shimazawa et al. | 360/59 |
| 2010/0290323 A1* | 11/2010 | Isogai et al. | 369/13.24 |

FOREIGN PATENT DOCUMENTS

| | | |
|---|---|---|
| JP | 2005-004901 | 1/2005 |
| JP | 2006-053978 | 2/2006 |
| JP | 2007-164935 | 6/2007 |
| JP | 2007-328841 | 12/2007 |
| JP | 2008-111845 | 5/2008 |
| JP | 2008-152897 | 7/2008 |
| JP | 2008-257819 | 10/2008 |

OTHER PUBLICATIONS

Michael Hochberg, et al. "Integrated Plasmon and dielectric waveguides" Optics Express, vol. 12, No. 22, Nov. 2004, pp. 5481 to 5486.
U.S. Appl. No. 12/260,639, filed Oct. 29, 2008 entitled Surface Plasmon Antenna With Propagation Edge and Near-Field Light Generating Element. Applicant: Koji Shimazawa.
U.S. Appl. No. 12/335,943, filed Dec. 16, 2008 entitled Near-Field Light Generating Element Comprising Surface Plasmon Antenna With Surface or Edge Opposed to Waveguide. Applicant: Eiji Komura.

* cited by examiner

*Primary Examiner* — Ali Neyzari
(74) *Attorney, Agent, or Firm* — Frommer Lawrence & Haug LLP

(57) ABSTRACT

Provided is a near-field light generating element in which as much amount as possible of waveguide light can be coupled with a plasmon antenna. The element comprises a light waveguide and a plasmon antenna comprising a surface or edge for propagating surface plasmon excited by waveguide light, extending to a near-field light generating end. A groove is formed in a waveguide side surface. And at least a portion of the surface or edge is embedded in the groove or located directly above the groove, being opposed to a wall or bottom surface of the groove with a predetermined distance, so as for waveguide light to be coupled with the plasmon antenna in surface plasmon mode. This configuration enables the surface or edge to be located at the position in which the surface or edge can be coupled with more amount of light, thereby to improve the light use efficiency.

26 Claims, 16 Drawing Sheets

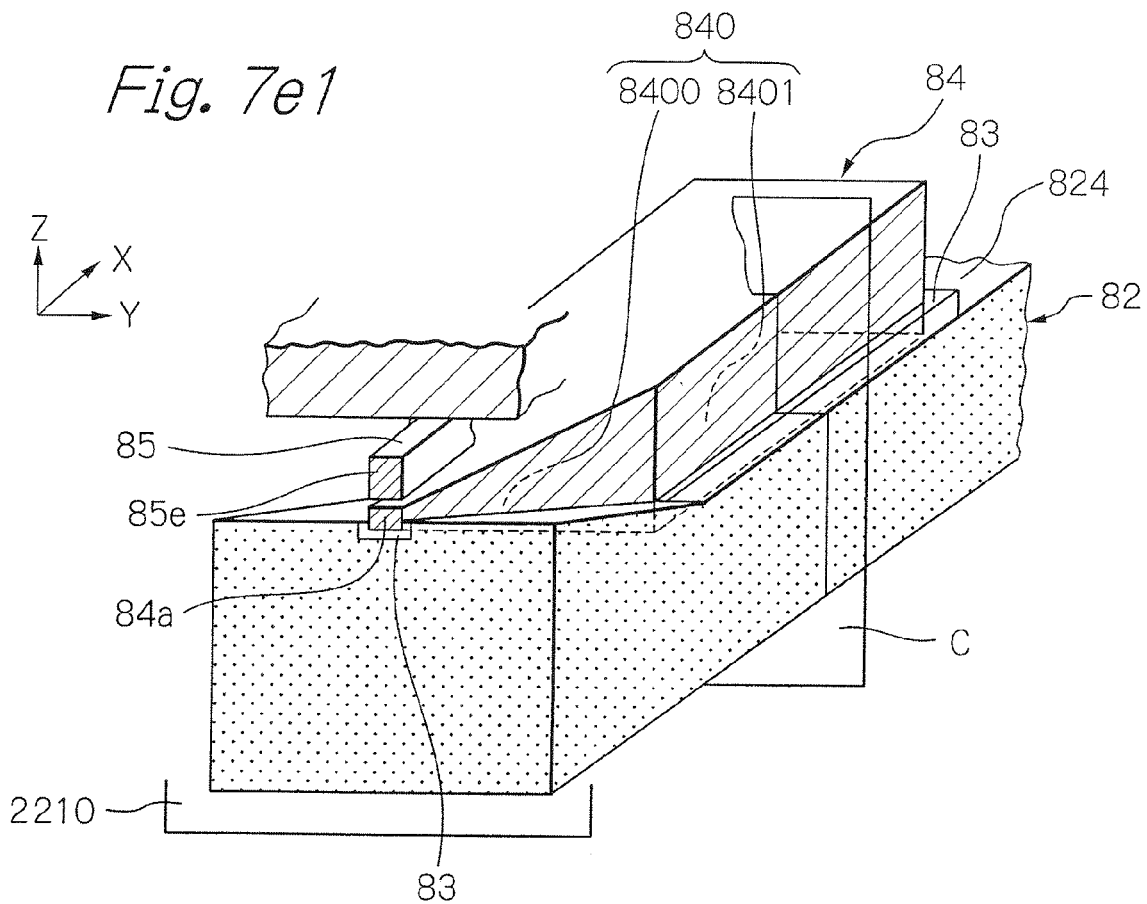
Fig. 7e1
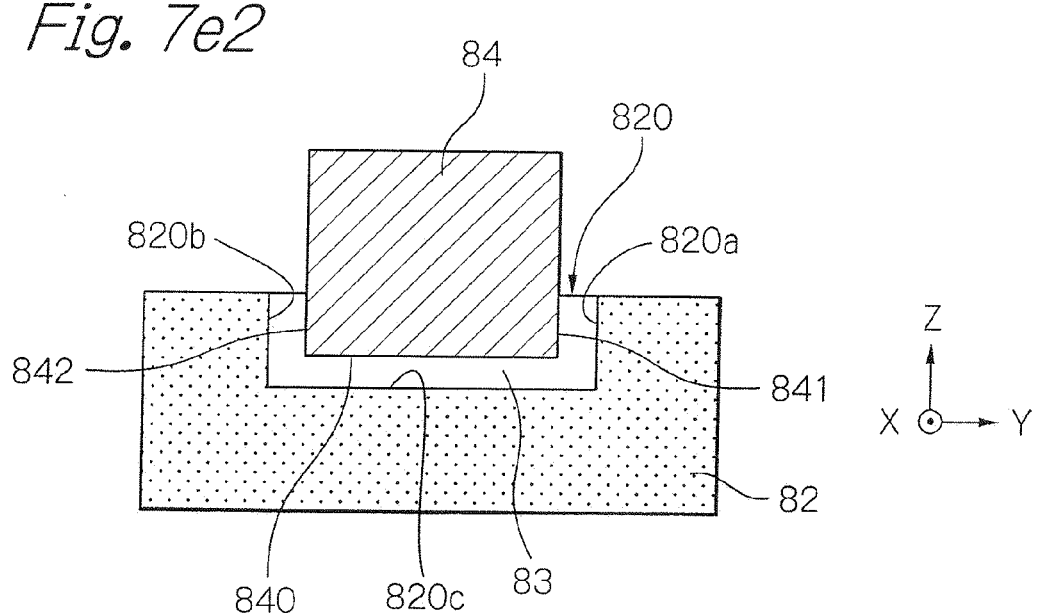
Fig. 7e2

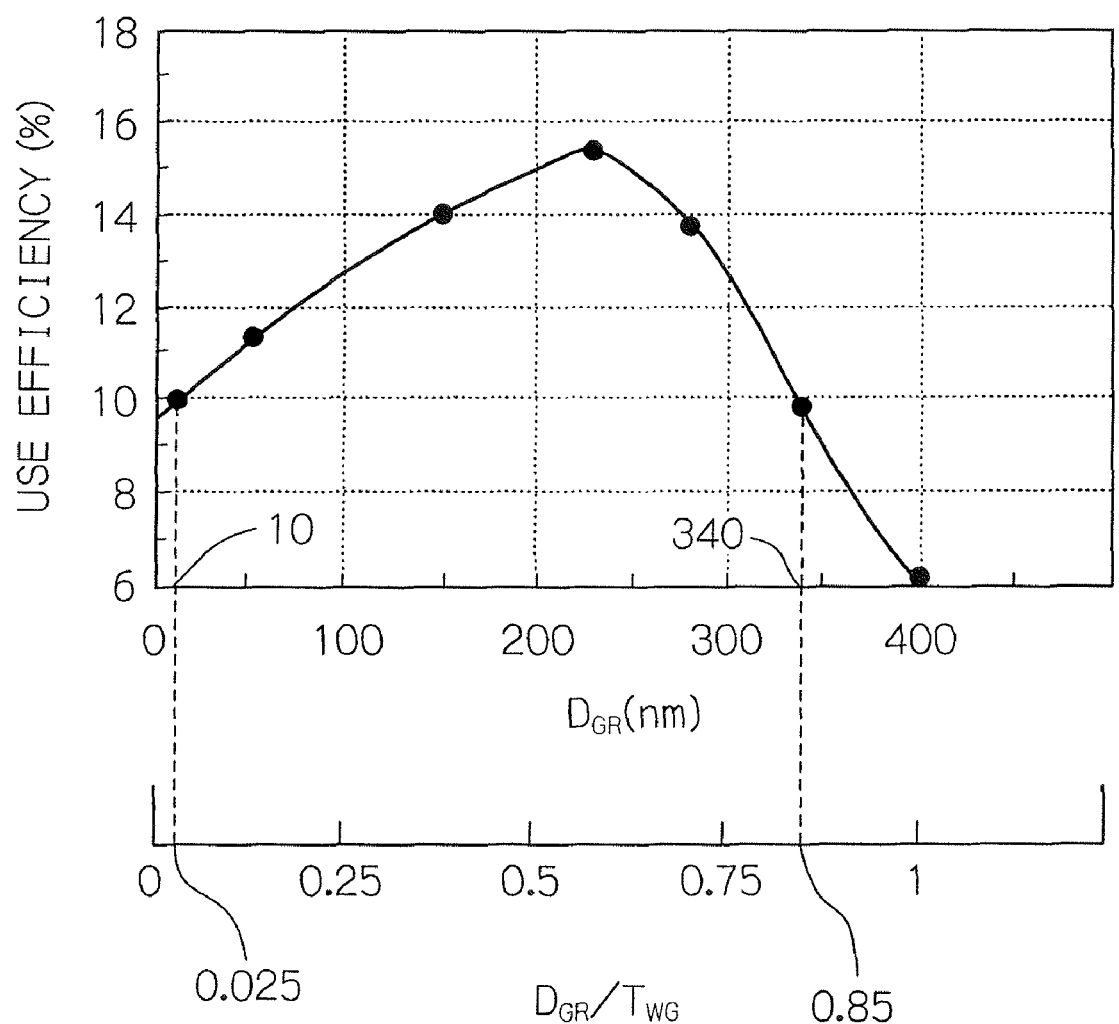

NEAR-FIELD LIGHT GENERATING ELEMENT COMPRISING SURFACE PLASMON ANTENNA AND WAVEGUIDE WITH GROOVE

BACKGROUND OF THE INVENTION

1. Field of the Invention

The present invention relates to a plasmon antenna for generating near-field light by being irradiated with light. And the present invention relates to a head used for thermally-assisted magnetic recording in which a magnetic recording medium is irradiated with near-field light, thereby anisotropic magnetic field of the medium is lowered, thus data can be written. Further, the present invention relates to a magnetic recording apparatus provided with the head.

2. Description of the Related Art

As the recording density of a magnetic disk apparatus becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together, and each of the magnetic microparticles has a single magnetic domain structure. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation in thermal stability of the magnetization due to the decrease in volume. Recently, as a method for solving this problem of thermal stability, so-called a thermally-assisted magnetic recording technique is proposed, in which the magnetic recording medium is formed of a magnetic material with a large magnetic anisotropy energy $K_U$, and writing is performed by reducing the anisotropic magnetic field with heat supplied to the magnetic recording medium just before applying write field.

As a thermally-assisted magnetic recording technique, a method has been generally known, in which a near-field light probe formed of a metal piece, so-called a plasmon antenna, is used for generating near-field light from plasmon that is excited by irradiated laser light. For example, U.S. Pat. No. 6,768,556 B1 discloses a plasmon antenna that includes a metal scatterer with a strobilus shape formed on a substrate and a dielectric material film formed around the metal scatterer. And US Patent Publication No. 2004/081031 A1 discloses a configuration in which a plasmon antenna is formed in contact with the main magnetic pole of a magnetic head for perpendicular magnetic recording in such a way that the irradiated surface of the plasmon antenna is perpendicular to the surface of a magnetic recording medium. Further, US Patent Publication No. 2003/066944 A1 discloses a technique in which the tip of a plasmon antenna is made closer to a magnetic recording medium to attempt to irradiate the medium with stronger near-field light.

As described above, various thermally-assisted magnetic recording techniques have been proposed, which uses plasmon antennas. The present inventors have devised a near-field light generating element in which laser light propagating through a waveguide (waveguide light) is coupled with a plasmon antenna in a surface plasmon mode to cause the excited surface plasmon to propagate to the opposed-to-medium surface, thereby providing near-field light, rather than directly applying the waveguide light to a plasmon antenna. The plasmon antenna in the element will be hereinafter referred to as a surface plasmon antenna. In the near-field light generating element, the temperature of the surface plasmon antenna does not excessively rise because waveguide light is not directly applied to the surface plasmon antenna. As a result, there can be avoided such a situation in which the end, which reaches the opposed-to-medium surface, of a read head element for reading data signal or servo signal from the magnetic recording medium becomes relatively far apart from the magnetic recording medium due to the thermal expansion of the plasmon antenna, which makes it difficult to properly read the servo signal. In addition, there can also be avoided such a situation in which the light use efficiency of the near-field light generating element is degraded because thermal disturbance of free electrons increases in the plasmon antenna. Here, the light use efficiency of a near-field light generating element is given by $I_{OUT}/I_{IN}(\times 100)$, where $I_{IN}$ is the intensity of laser light incident to the waveguide, and $I_{OUT}$ is the intensity of near-field light emitted from a near-field light generating end of the plasmon antenna after converting the laser light into surface plasmon in the plasmon antenna.

The above-described near-field light generating element is required to have more improved light use efficiency. Actually, it is known that the light use efficiency of at least 10% (percent) or more is needed in order to achieve favorable thermally-assisted magnetic recording. To meet the requirement in the above-described near-field light generating element, especially, it is significantly important to couple as much amount as possible of the waveguide light with the plasmon antenna in a surface plasmon mode.

SUMMARY OF THE INVENTION

Therefore, an object of the present invention is to provide a near-field light generating element in which as much amount as possible of light propagating through a waveguide (waveguide light) can be coupled with a plasmon antenna in a surface plasmon mode, and thus the light use efficiency is improved.

Another object of the present invention is to provide a thermally-assisted magnetic recording head capable of appropriately heating the write position on the magnetic recording medium, to provide a head gimbal assembly (HGA) provided with the head, and further, to provide a magnetic recording apparatus provided with the HGA.

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a near-field light generating element is provided, which comprises:

a waveguide through which a light for exciting surface plasmon propagates; and a plasmon antenna comprising: a near-field light generating end for emitting near-field light; and a propagation surface or a propagation edge for causing surface plasmon excited by the light to propagate thereon, extending to the near-field light generating end, a groove being formed in a side surface of the waveguide, and at least a portion of the propagation surface or the propagation edge being embedded in the groove or being located directly above the groove, the at least a portion being opposed to a wall surface or a bottom surface of the groove with a predetermined distance, so as for the light propagating through the waveguide to be coupled with the plasmon antenna in a surface plasmon mode.

In the above-described near-field light generating element, the embedded propagation surface or propagation edge is located at a position closer to the center of the intensity distribution (generally, a Gaussian distribution) of the light (waveguide light) propagating through the waveguide. Here, the center is a center of intensity distribution before the groove is formed in the waveguide. That is, the propagation surface or propagation edge is located at the position in which the surface or edge can be coupled with more amount of light in a surface plasmon mode. Thereby, the light use efficiency of the near-field light generating element is improved.

In the near-field light generating element according to the present invention, the at least a portion of the propagation surface or the propagation edge of the plasmon antenna is preferably opposed to the wall surface or the bottom surface of the groove through a buffering portion having a refractive index lower than a refractive index of the waveguide. In this case, the buffering portion preferably has a refractive index equal to or higher than a refractive index of a material covering an end surface of the plasmon antenna, the end surface being opposite to the propagation surface or the propagation edge. Further, the buffering portion is preferably a portion of an overcoat layer formed so as to cover the waveguide.

Furthermore, the at least a portion of the propagation surface or the propagation edge of the plasmon antenna is preferably positioned most deeply in the groove. Further, it is also preferable that the plasmon antenna comprises the propagation edge, and the groove is an engraved portion with a V-shaped cross-section. Furthermore, the plasmon antenna is preferably formed of one element selected from a group of Pd, Pt, Rh, Ir, Ru, Au, Ag, Cu or Al, or an alloy made of at least two selected from the group.

Further, in the above-described near-field light generating element according to the present invention, it is preferable that the groove is formed to extend to the neighborhood of the near-field light generating end, and the whole of the propagation surface or the propagation edge is embedded in the groove or located directly above the groove, the whole of the propagation surface or the propagation edge being opposed to the wall surface or the bottom surface of the groove with a predetermined distance. In this case, surface plasmon, which reaches the near-field light generating end, can propagates without significantly changing its wavenumber $K_{SP}$ during the propagation, which leads to a less propagation loss.

Further, in the above-described near-field light generating element according to the present invention, a depth of the groove below the side surface of the waveguide is preferably 10 nm (nanometers) or more, and 340 nm or less, and is preferably 2.5% (percent) or more of a thickness of the waveguide, and 85% or less of the thickness. This setting enables the near-field light generating element to have a high light use efficiency of 10% or more.

According to the present invention, a thermally-assisted magnetic recording head is further provided, which comprises:

a magnetic pole for generating write field from its end on an opposed-to-medium surface side;

a waveguide through which a light for exciting surface plasmon propagates; and a plasmon antenna comprising: a near-field light generating end for emitting near-field light, reaching the opposed-to-medium surface; and a propagation surface or a propagation edge for causing surface plasmon excited by the light to propagate thereon, extending to the near-field light generating end, a groove being formed in a side surface of the waveguide, and at least a portion of the propagation surface or the propagation edge being embedded in the groove or being located directly above the groove, the at least a portion being opposed to a wall surface or a bottom surface of the groove with a predetermined distance, so as for the light propagating through the waveguide to be coupled with the plasmon antenna in a surface plasmon mode.

In the thermally-assisted magnetic recording head according to the present invention, the waveguide is preferably provided in a side opposite to the magnetic pole in relation to the plasmon antenna. Here, it is also preferable that a portion on the opposed-to-medium surface side of the plasmon antenna is inclined so as to become closer to an end portion on the opposed-to-medium surface side of the magnetic pole toward the opposed-to-medium surface. And it is also preferable that a portion on the opposed-to-medium surface side of the magnetic pole is inclined so as to become closer to an end portion on the opposed-to-medium surface side of the plasmon antenna toward the opposed-to-medium surface. With these configurations, the distance between the waveguide and the magnetic pole can be set to a sufficiently large value while the near-field light generating end of the plasmon antenna is positioned near the end surface on the opposed-to-medium surface side of the magnetic pole. As a result, there can be surely avoided such a situation in which a part of the light is absorbed into the magnetic pole and the amount of light to be converted into the near-field light is reduced. Further, it is also preferable that a thermal conduction layer is provided between the plasmon antenna and the magnetic pole, so as to cover an end surface of the plasmon antenna, the end surface being opposite to the propagation surface or the propagation edge.

According to the present invention, an HGA is further provided, which comprises the above-described thermally-assisted magnetic recording head and a suspension supporting the thermally-assisted magnetic recording head.

According to the present invention, a magnetic recording apparatus is further provided, which comprises: at least one HGA described above; at least one magnetic recording medium; and a recording circuit for controlling write operations which the thermally-assisted magnetic recording head performs to the at least one magnetic recording medium, and the recording circuit further comprising a light-emission control circuit for controlling operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements is arbitrary for viewability.

BRIEF DESCRIPTION OF THE DRAWINGS

FIGS. 7a to 7f show schematic views illustrating various embodiments regarding the shape and arrangement of the near-field light generating element (the waveguide, the buffering portion and the surface plasmon antenna) and the main magnetic pole according to the present invention;

FIG. 9 shows a graph illustrating the relationship between the depth $D_{GR}$ of the groove and the light use efficiency shown in Table 1.

DESCRIPTION OF THE PREFERRED EMBODIMENTS

Figure 1:
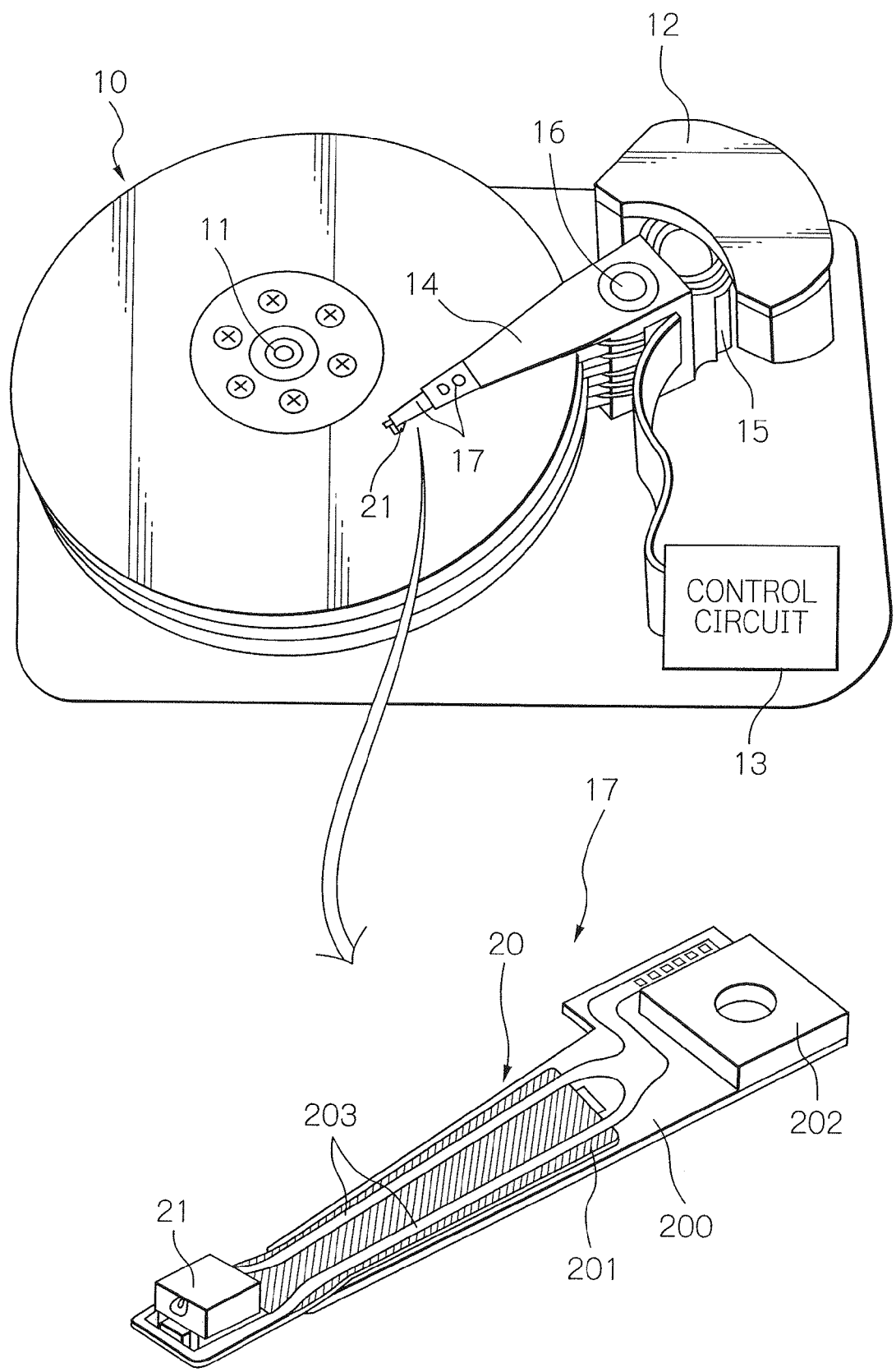
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
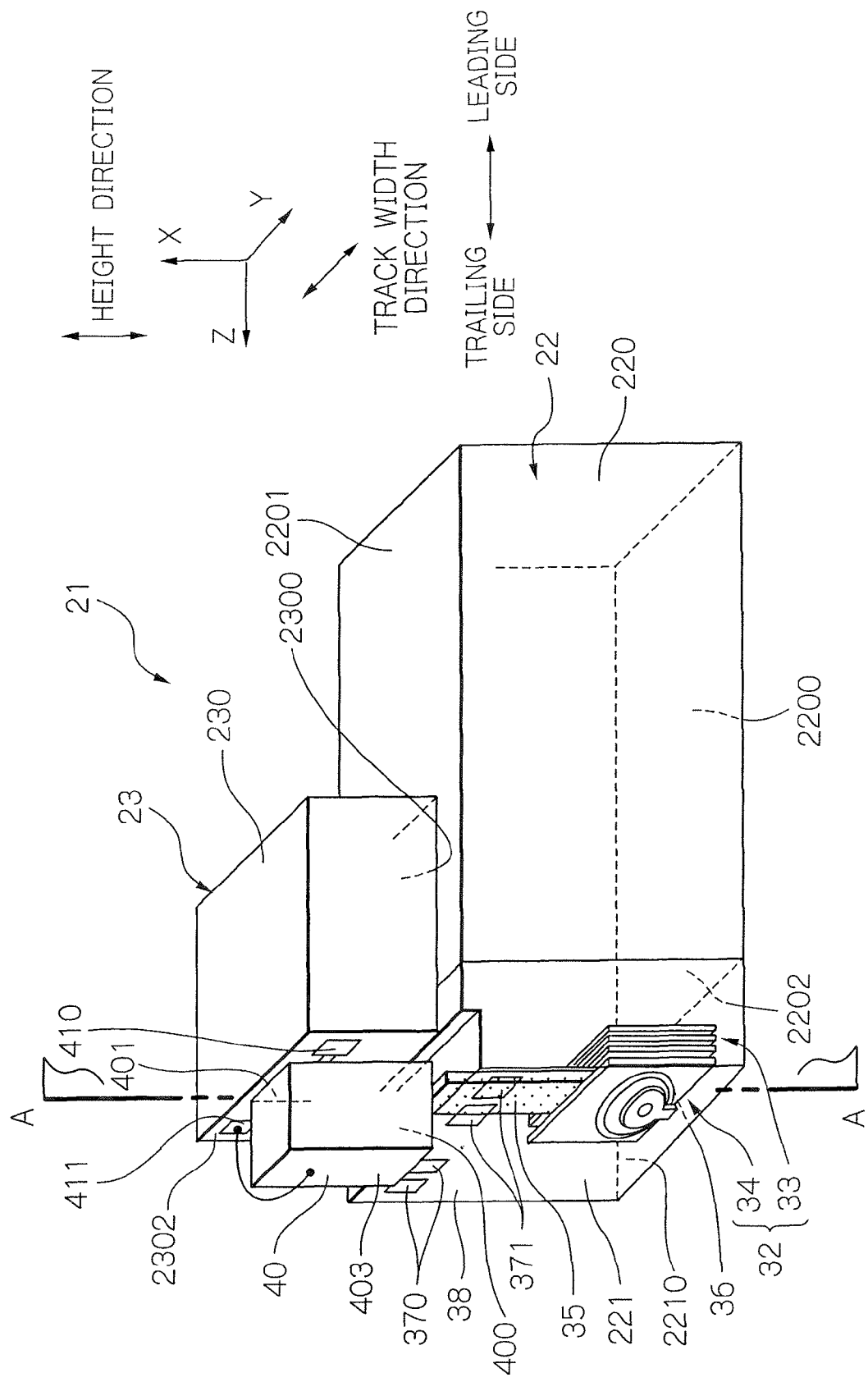
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon antenna 36 which, together with the waveguide 35, constitutes a near-field light generating element; an overcoat layer 38 formed on the element-formation surface 2202, so as to cover the MR element 33, the electromagnetic transducer 34, the waveguide 35, and the surface plasmon antenna 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34, and the surface plasmon antenna 36 reach the head part end surface 2210, which is an opposed-to-medium surface of the head part 221. The waveguide 35 is provided along the surface plasmon antenna 36 as described later; thus, in the present embodiment, one end of the waveguide 35 also reaches the head part end surface 2210. Here, the head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is generated from the laser diode 40 of the light source unit 23 and propagates through the waveguide 35. Then, the laser light (waveguide light) is coupled with the surface plasmon antenna 36 in a surface plasmon mode, and causes surface plasmon to be excited on the surface plasmon antenna 36, as described in detail later. The surface plasmon propagates on a propagation edge or a propagation surface provided in the surface plasmon antenna 36, which will be detailed later, toward the head part end surface 2210, which causes near-field light to be generated from the end on the head part end surface 2210 side of the surface plasmon antenna 36. The generated near-field light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished.

Figure 3:
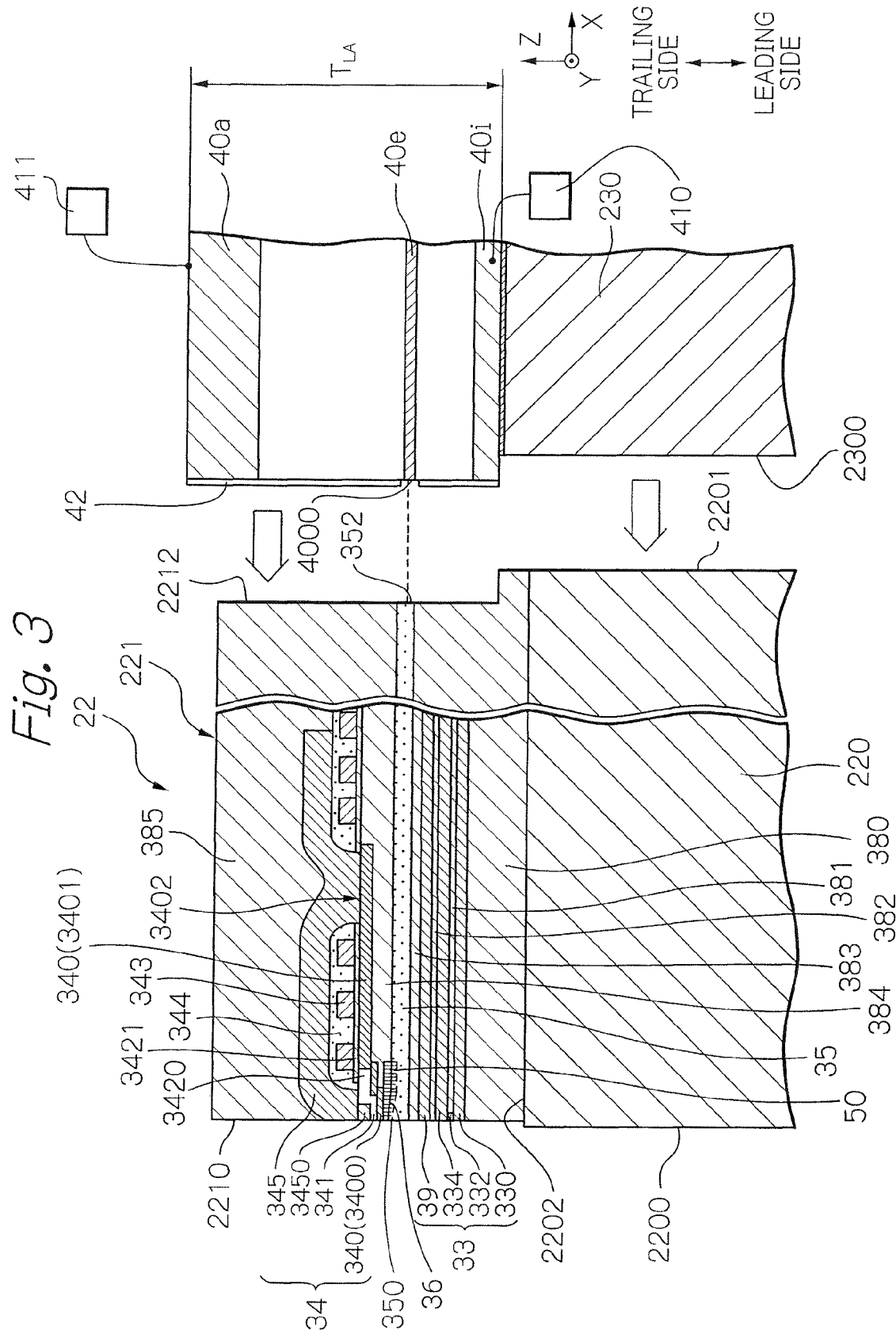
FIG. 3 shows a cross-sectional view taken by plane A in FIG. 2, schematically illustrating a main part of the thermally-assisted magnetic recording head.

FIG. 3 shows a cross-sectional view taken by plane A in FIG. 2, schematically illustrating a main part of the thermally-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm (micrometers), by using a frame plating method or a sputtering method.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

Also as shown in FIG. 3, the electromagnetic transducer 34 is designed for perpendicular magnetic recording in the present embodiment, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a structure in which a main magnetic pole 3400 and a main pole body 3401 are sequentially stacked. The main magnetic pole 3400 includes: a first main pole portion 3400a having a small width $W_P$ (FIG. 5) in the track width direction; and a second main pole portion 3400b located on the first main pole portion 3400a and at the rear (+X side) of the portion 3400a. The small width $W_P$ of the first main pole portion 3400a enables a fine write magnetic field to be generated, so that the track width can be set to be a very small value adequate for higher recording density. The main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The gap layer 341 forms a gap provided for separating the main magnetic pole layer 340 from the write shield layer 345 in the region near the head part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the distance between the main magnetic pole layer 340 and the write shield layer 345, and is, for example, in the range of approximately 0.01 to 0.5 μm. The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

The write shield layer 345 reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. In the present embodiment, the trailing shield 3450 has a width in the track width direction larger than the width of the main pole body 3401 as well as than the first main pole portion 3400a. This trailing shield 3450 causes the magnetic field gradient between the end portion of the trailing shield 3450 and the first main pole portion 3400a to become steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Referring also to FIG. 3, the waveguide 35 and the surface plasmon antenna 36 are provided between the MR element 33 and the electromagnetic transducer 34, and constitute a near-field light generating element as an optical system within the head part 221. Here, the waveguide 35 is arranged in parallel with the element-formation surface 2202, and extends from an rear-end surface 352 reaching the head part rear-end surface 2212 to an end surface 350 that is a part of the head part end surface 2210. Further, a groove 54 is formed, as explained in detail later with reference to FIG. 4, in the upper surface (side surface) of the waveguide 35, the upper surface being opposed to the surface plasmon antenna 36. Furthermore, a portion of the surface plasmon antenna 36 is embedded in the groove 54, the portion being opposed to the wall surface or bottom surface of the groove 54 with a predetermined distance. And the portion of the surface plasmon antenna 36 is opposed to the wall surface or bottom surface of the groove 54 through a buffering portion 50 having a refractive index lower than that of the waveguide 35. Therefore, in the present embodiment, one end of the buffering portion 50 also reaches the head part end surface 2210. The buffering portion 50 acts for coupling the waveguide light, which propagates through the waveguide 35, with the surface plasmon antenna 36 in the surface plasmon mode. Here, the buffering portion 50 may be a portion of an insulating layer 384 that is a part of the overcoat layer 38, or a new layer provided other than the insulating layer 384. A detailed description of the waveguide 35, the surface plasmon antenna 36, and the buffering portion 50 will be given later with reference to FIG. 4.

Further, as is in the present embodiment, an inter-element shield layer 39 is preferably provided between the MR element 33 and the electromagnetic transducer 34 (waveguide 35), sandwiched by the insulating layers 382 and 383. The inter-element shield layer 39 may be formed of soft-magnetic material, and plays a role for shielding the MR element 33 from the magnetic field generated from the electromagnetic transducer 34. Further, a backing coil portion may be provided between the inter-element shield layer 39 and the waveguide 35, though not shown in the figure. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 3, the light source unit 23 includes: a unit substrate 230; a laser diode 40 provided on the source-installation surface 2302 of the unit substrate 230; a terminal electrode 410 electrically connected to the lower surface 401 as an electrode of the laser diode 40; and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the waveguide light to be coupled with the surface plasmon antenna 36 through the buffering portion 50 in the surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm to 1.7 µm (micrometer). Specifically, for example, a laser diode of InGaAsP/InP quaternary mixed crystal can also be used, in which possible wavelength region is set to be from 1.2 to 1.67 µm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers made of, for example, $SiO_2$ or $Al_2O_3$ for exciting the oscillation by total reflection. Further, the reflective layer 42 has an opening in the position of the active layer 40e including the light-emission center 4000. Here, the laser diode 40 has, for example, a thickness $T_{LA}$ of approximately 60 to 200 µm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. In practice, a predetermined voltage is applied between the terminal electrode 410 connected electrically to the lower-electrode 40i and the terminal electrode 411 connected electrically to the upper-electrode 40a by using the electric source, to oscillate the laser diode 40. Then, laser light radiates from the opening including the emission center 4000 of the reflective layer 42.

The laser diode 40 and terminal electrodes 410 and 411 are not limited to the above-described embodiment. Further, alternatively, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

By joining the above-described slider 22 and light source unit 23, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined so that the laser light generated from the laser diode 40 can directly enter the waveguide 35 through the rear-end surface 352 opposite to the ABS 2200 of the waveguide 35.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, for example, in which the width in the track width direction is 425 µm; the length is 300 µm; and the thickness is 300 µm.

Figure 4:
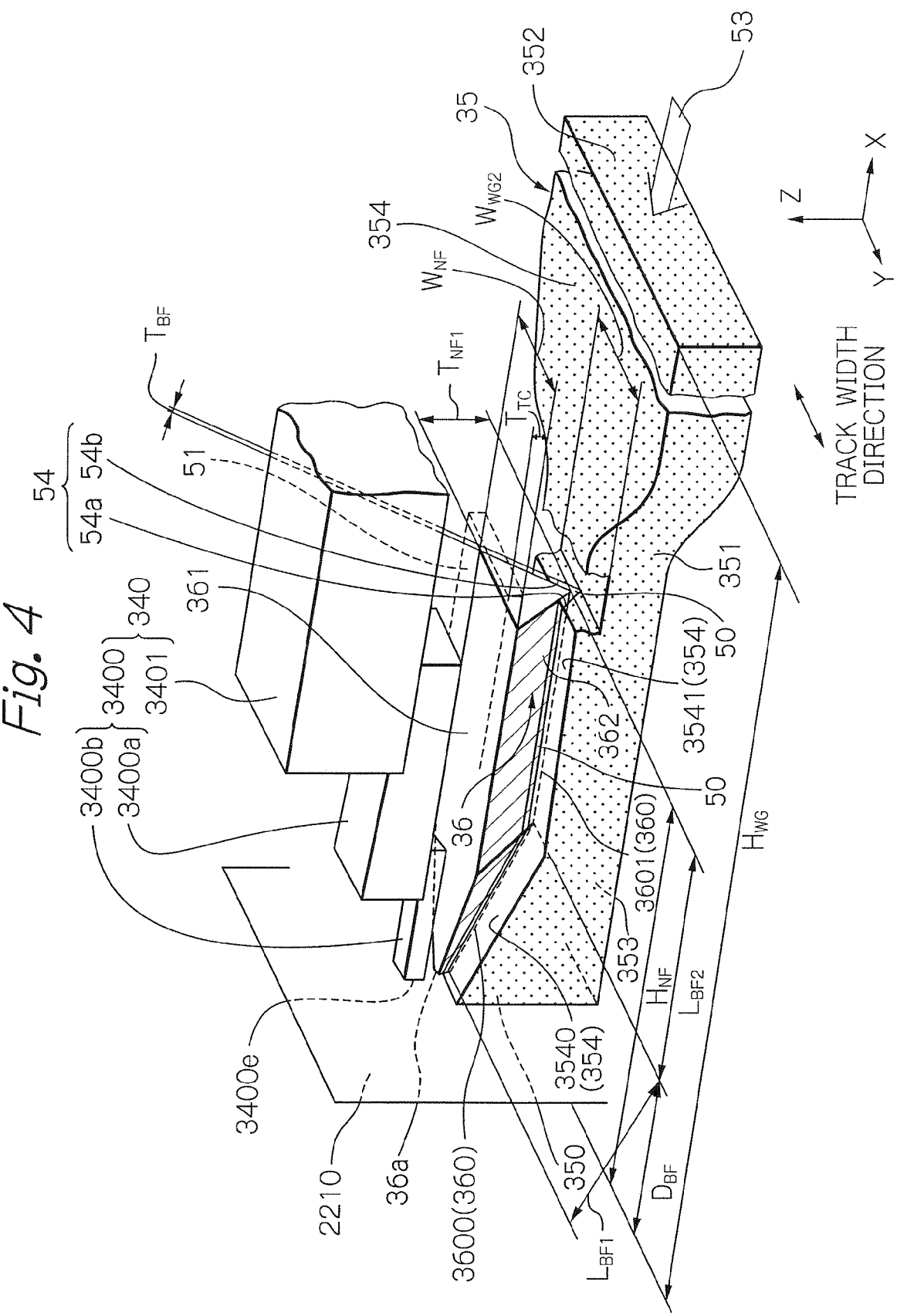
FIG. 4 shows a perspective view schematically illustrating the configuration of the waveguide, the surface plasmon antenna and the main magnetic pole layer.

FIG. 4 shows a perspective view schematically illustrating the configuration of the waveguide 35, the surface plasmon antenna 36 and the main magnetic pole layer 340. In the figure, the head part end surface 2210 is positioned at the left side, the end surface 2210 including positions where write field and near-field light are emitted toward the magnetic recording medium.

Referring to FIG. 4, the configuration includes: the waveguide 35 for propagating laser light 53 used for generating near-field light; and the surface plasmon antenna 36 that has a propagation edge 360 as an edge on which surface plasmon excited by the laser light (waveguide light) 53 propagates. The surface plasmon antenna 36 further has a near-field light generating end surface 36a reaching the head part end surface 2210. Further, a groove 54 is provided in a portion of the side surface 354 of the waveguide 35, that is, in the side surfaces 3540 and 3541. In the present embodiment, the side surface 354 of the waveguide 35 and the groove 54 extend to the neighborhood of the near-field light generating end surface 36a. And the groove 54 is, in the present embodiment, an engraved portion with its cross-section (by YZ plane) V-shaped. Here, a side surface of the waveguide 35 indicates, out of end surfaces surrounding the waveguide 35, end surfaces other than the end surface 350 on the head part end surface 2210 side and the rear-end surface 352 on the opposite side, these end surfaces 350 and 352 being perpendicular to the propagating direction (−X direction) of the laser light 53. The side surface serves as a surface on which the propagating waveguide light 53 can be totally reflected in the waveguide 35 that corresponds to a core. In the present embodiment, the side surface 354 in which the groove 54 is formed is the upper surface of the waveguide 35.

Further, a portion, including the propagation edge 360, of the surface plasmon antenna 36 is embedded in the groove 54, the portion being opposed to the wall surfaces 54a and 54b of the groove 54 with a predetermined distance. And the propagation edge 360 is opposed to the wall surfaces 54a and 54b of the groove 54 through a buffering portion 50 having a refractive index lower than that of the waveguide 35. That is, the propagation edge 360 is covered with the buffering portion 50, and in the present embodiment, both ends of the propagation edge 360 and the buffering portion 50 reach the head part end surface 2210. The buffering portion 50 acts for coupling the waveguide light 53 with the surface plasmon antenna 36 (propagation edge 360) in the surface plasmon mode. And the propagation edge 360 plays a role of propagating surface plasmon excited by the waveguide light 53 to the near-field light generating end surface 36a. Alternatively, the propagation edge 360 can be positioned near and directly above the groove 54, the portion being opposed to the wall surfaces 54a and 54b of the groove 54 with a predetermined distance. Here, "directly above" the groove 54 means: toward a direction that is perpendicular to the side surface 354 in which the groove 54 is formed, and is being apart away from the groove 54. Further, the buffering portion 50 may be a portion of the overcoat layer 38 (FIG. 2) or a new layer provided other than the overcoat layer 38.

Further, the near-field light generating end surface 36a of the surface plasmon antenna 36 is close to an end surface 3400e of the main magnetic pole 3400, the end surface 3400e reaching the head part end surface 2210. Moreover, the propagation edge 360 extends to the near-field light generating end surface 36a, the edge 360 being opposed to the wall surfaces 54a and 54b of the groove 54 in the waveguide 35 with a predetermined distance through the buffering portion 50. Further, the inclined portion 3600 of the propagation edge 360 on the end surface 36a side (end surface 2210 side) has a shape of line or curve extending so as to become closer to the end surface 361 on the side opposite to the propagation edge 360 of the plasmon antenna 36 toward the near-field light generating end surface 36a. The propagation edge 360 can be made rounded to prevent surface plasmon from running off from the edge 360. The curvature radius of the rounded edge may be, for example, in the range of 5 to 500 nm.

Further, in the present embodiment, the surface plasmon antenna 36 tapers toward the near-field light generating end surface 36a in the height direction (Z-axis direction) near the head part end surface 2210. And the surface plasmon antenna 36 has a cross-section taken by YZ plane with a triangular shape, and especially has a predetermined triangular shape in the vicinity of the head part end surface 2210. As a result, in the present embodiment, the near-field light generating end surface 36a has a triangular shape (FIG. 5a) in which one apex is the end of the propagation edge 360 reaching the end surface 36a. Here, surface plasmon propagating on the propagation edge 360 reaches the near-field light generating end surface 36a, and then causes near-field light to be generated from the end surface 36a.

The waveguide 35 and the buffering portion 50 are provided in −Z direction side, that is, in the side opposite to the main magnetic pole 3400 in relation to the surface plasmon antenna 36. As a result, the propagation edge 360, which is covered with the buffering portion 50, is also positioned on the side opposite to the main magnetic pole 3400 in the surface plasmon antenna 36. With such a configuration, even when a distance between the end surface 3400e for generating write field in the main magnetic pole 3400 and the near-field light generating end surface 36a for emitting near-field light is sufficiently small, preferably 100 nm or less, the waveguide 35 can be sufficiently separated apart from the main magnetic pole 3400 and the main pole body 3401. Resultantly, there can be avoided such a situation in which a part of the waveguide light 53 is absorbed into the main magnetic pole 3400 or main pole body 3401 made of metal and the amount of light to be converted into the near-field light is reduced.

Also as shown in FIG. 4, the waveguide 35 may have a rectangular parallelepiped shape, or may have a portion on the head part end surface 2210 side, which has a narrower width in the track width direction (Y-axis direction). The width $W_{WG1}$ in the track width direction (Y-axis direction) of a portion on the side of the end surface opposite to the head part end surface 2210 of the waveguide 35 may be, for example, in the range approximately from 0.5 to 200 µm (micrometers).

The width $W_{WG2}$ in the track width direction (Y-axis direction) of a portion on the end surface 350 side of the waveguide 35 may be, for example, in the range approximately from 0.3 to 100 µm. And the thickness $T_{WG}$ (in Z-axis direction) of a portion on the rear-end surface 352 side may be, for example, in the range approximately from 0.1 to 4 µm, and the height (length) $H_{WG}$ (in X-axis direction) may be, for example, in the range approximately from 10 to 300 µm.

Further, the side surfaces of the waveguide 35: the upper surface 354; the lower surface 353; and both the side surfaces 351 in the track width direction (Y-axis direction) have a contact with the overcoat layer 38 (FIG. 2) except the groove 54 portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the wavelength $\lambda_L$ of laser light is 600 nm and the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_XN_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of waveguide light 53 to be reduced due to the excellent optical characteristics of the constituent material. Further, the waveguide 35 can provide the total reflection in all the side surfaces due to the existence of the overcoat layer 38 as a clad. As a result, more amount of waveguide light 53 can reach the position of the buffering portion 50, which improves the propagation efficiency of the waveguide 35.

Further, alternatively, the waveguide 35 may have a multi-layered structure of dielectric materials in which the upper a layer is in the multilayered structure, the higher becomes the refractive index n of the layer. The multilayered structure can be realized, for example, by sequentially stacking dielectric materials of $SiO_XN_Y$ with the composition ratios X and Y appropriately changed. The number of stacked layers may be, for example, in the range from 8 to 12. In the case that laser light 53 has a linear polarization in Z-axis direction, the above-described structure enables the laser light 53 to propagate in the position closer to the buffering portion 50 (groove 54). In this case, by choosing the composition and layer thickness in each layer, and the number of layers of the multilayered structure, the laser light 53 can propagate in the desired position in Z-axis direction.

The surface plasmon antenna 36 is preferably formed of a conductive material of, for example, metal such as Pd, Pt, Rh, Ir, Ru, Au, Ag, Cu or Al, or an alloy made of at least two of these elements. Further, the surface plasmon antenna 36 can have a width $W_{NF}$ in the track width direction (Y-axis direction) sufficiently smaller than the wavelength of the laser light 53, for example, of approximately 10 to 100 nm. And the surface plasmon antenna 36 can have a thickness $T_{NF1}$ (in Z-axis direction) sufficiently smaller than the wavelength of the laser light 53, for example, of approximately 10 to 100 nm. Further, the length (height) $H_{NF}$ (in X-axis direction) can be set to be, for example, in the range of, approximately 0.8 to 6.0 µm.

The buffering portion 50 is formed of a dielectric material having refractive index $n_{BF}$ lower than the refractive index $n_{WG}$ of the waveguide 35. For example, when the wavelength $\lambda_L$ of laser light is 600 nm and the waveguide 35 is formed of $Al_2O_3$ (n=1.63), the buffering portion 50 may be formed of $SiO_2$ (n=1.46). Further, when the waveguide 35 is formed of $Ta_2O_5$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ (n=1.46) or $Al_2O_3$ (n=1.63).

Further, the length $L_{BF2}$ (in X-axis direction) of a portion of the buffering portion 50, the portion being sandwiched between the side surface 3541 of the waveguide 35 and the propagation edge 3601, is preferably in the range of 0.5 to 5 µm. Furthermore, the length ($L_{BF1}+L_{BF2}$) of the whole buffering portion 50, that is, the portion through which the waveguide 35 and the surface plasmon antenna 36 are coupled with each other in a surface plasmon mode, is preferably larger than the wavelength $\lambda_L$ of the laser light 53. In this preferable case, the coupled portion has an area markedly larger than a so-called "focal region" in the case that, for example, laser light is converged on a buffering portion 50 and a surface plasmon antenna 36 and coupled in a surface plasmon mode. As a result, very stable coupling in the surface plasmon mode can be achieved. The thickness $T_{BF}$ of a portion of the buffering portion 50 in the direction perpendicular to the wall surface 54a or 54b of the waveguide 35 can be set to be, for example, in the range of 10 to 250 nm. The lengths $L_{BF1}$, $L_{BF2}$ and the thickness $T_{BF}$ are important parameters for obtaining proper excitation and propagation of surface plasmon.

Also as shown in FIG. 4, a thermal conduction layer 51 is preferably provided on the head part end surface 2210 side between the surface plasmon antenna 36 and the first main pole portion 3400a. The thermal conduction layer 51 is formed of, for example, an insulating material such as AlN, SiC or DLC, which has higher thermal conductivity compared with that of the overcoat layer 38 (FIG. 2). The arrangement of such a thermal conduction layer 51 allows a part of the heat generated when the surface plasmon antenna 36 emits near-field light to get away to the main magnetic pole 3400 and the first main pole portion 3400a through the thermal conduction layer 51. That is, the main magnetic pole 3400 and the first main pole portion 3400a can be used as a heatsink. Resultantly, excessive temperature rise of the surface plasmon antenna 36 can be suppressed, and there can be avoided unwanted protrusion of the near-field light generating end surface 36a and substantial reduction in the light use efficiency of the surface plasmon antenna 36.

The thickness $T_{TC}$ of the thermal conduction layer 51 is equivalent to a distance $D_{N-P}$ (FIG. 5a) between the near-field light generating end surface 36a and the end surface 3400e of the main magnetic pole 3400, and is set to be a small value of 100 nm or less. Further, the refractive index $n_{IN}$ of the thermal conduction layer 51 is set equal to or lower than the refractive index $n_{BF}$ of the buffering portion that covers the propagation edge 360 of the surface plasmon antenna 36. That is, the propagation edge 360 of the surface plasmon antenna 36 is covered with a material having a refractive index $n_{BF}$ equal to or higher than the refractive index $n_{IN}$ of a material covering the end surface 361 opposite to the edge 360 of the surface plasmon antenna 36. This allows surface plasmon to propagate stably on the propagation edge 360. It is known to be preferable in practice to satisfy the relation of refractive index $n_{BF} \geq$ refractive index $n_{IN} \times 1.5$.

Also according to FIG. 4, the main magnetic pole layer 340 includes, as described-above, the main magnetic pole 3400 and the main pole body 3401. The main magnetic pole 3400 includes; the first main pole portion 3400a having the end surface 3400e reaching the head part end surface 2210; and the second main pole portion 3400b, the end portion on the head part end surface 2210 side of the portion 3400b being overlapped on a portion, on the side opposite to the end surface 2210, of the first main pole portion 3400a. Further, the end portion on the head part end surface 2210 side of the main pole body 3401 is overlapped on a portion, on the side opposite to the end surface 2210, of the second main pole portion 3400b. Namely, the end portion on the head part end surface 2210 side of the main magnetic pole layer 340 has a shape extending slantwise relative to the element-formation surface 2202 (FIG. 3) toward the end portion on the head part end surface 2210 side of the surface plasmon antenna 36. As a result, the end surface 3400e of the main magnetic pole layer 340 can be made sufficiently close to the near-field light generating end surface 36a, under the condition that the main magnetic pole layer 340 is sufficiently separated apart from the waveguide 35.

Figure 5A:
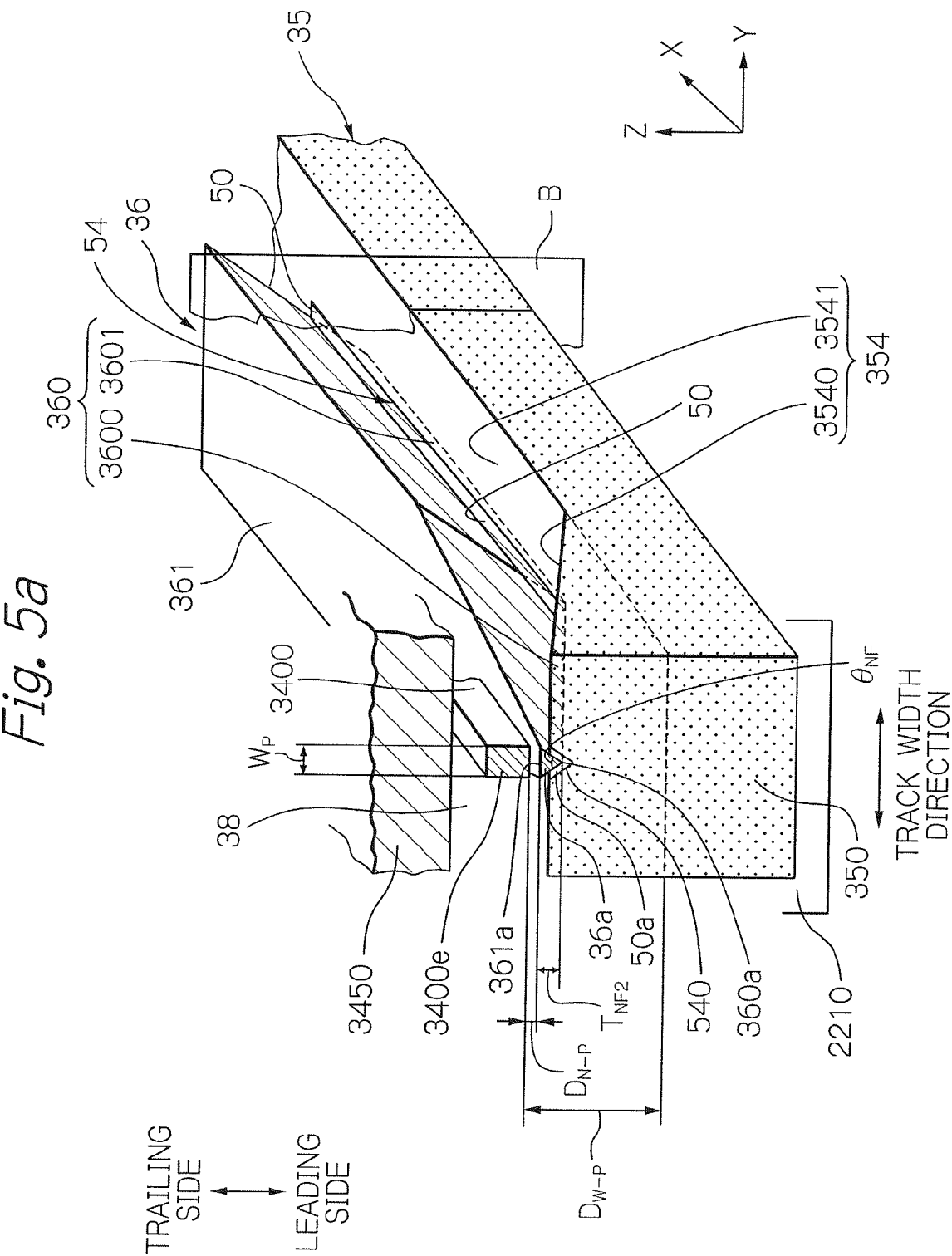
FIG. 5a shows a perspective view illustrating the shapes of the end surfaces of the waveguide, the surface plasmon antenna and the electromagnetic transducer on the head part end surface.
Figure 5B:
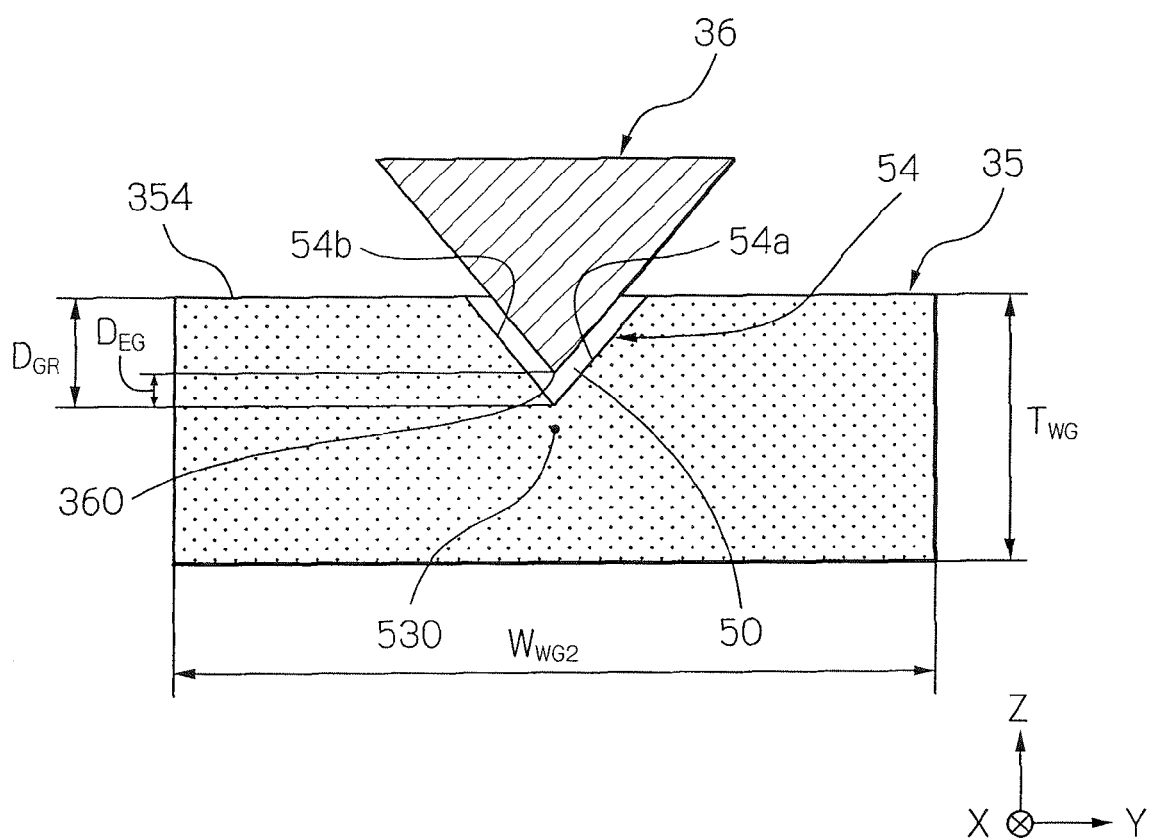
FIGS. 5b and 5c show cross-sectional views taken by plane B shown in FIG. 5a, schematically illustrating the configuration of the waveguide and the surface plasmon antenna.
Figure 5C:
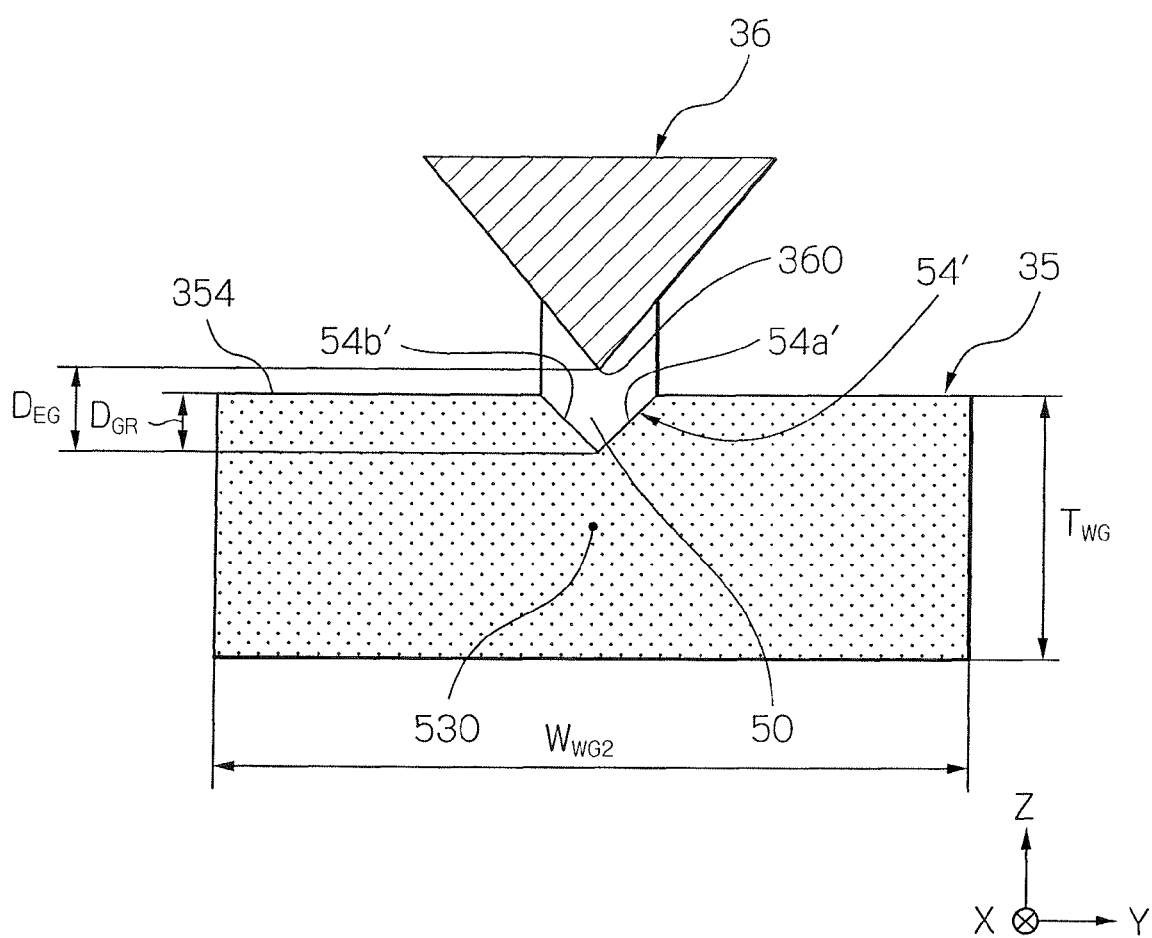

FIG. 5a shows a perspective view illustrating the shapes of the end surfaces of the waveguide 35, the surface plasmon antenna 36 and the electromagnetic transducer 34 on the head part end surface 2210. The front face of the figure is the head part end surface 2210. And FIGS. 5b and 5c show cross-sectional views taken by plane B shown in FIG. 5a, schematically illustrating the configuration of the waveguide 35 and the surface plasmon antenna 36.

As shown in FIG. 5a, the main magnetic pole 3400 (the first main pole portion 3400a) and the write shield layer 345 (the trailing shield 3450) of the electromagnetic transducer 34 reach the head part end surface 2210. The shape of the end surface 3400e of the main magnetic pole 3400 on the head part end surface 2210 is, for example, a rectangle, a square or a trapezoid. Here, the above-described width $W_P$ is a length of the edge on the leading side of the end surface 3400e of the main magnetic pole 3400, and provides the width of a track formed on the magnetic recording layer of the magnetic disk in the case of magnetic-field-dominant recording. The width $W_P$ can be, for example, in the range of approximately 0.05 to 0.5 μm.

Moreover, on the head part end surface 2210, the near-field light generating end surface 36a of the surface plasmon antenna 36 is positioned close to the end surface 3400e of the main magnetic pole 3400 and in the leading side (−Z direction side) of the end surface 3400e. Here, a distance $D_{N-P}$ between the near-field light generating end surface 36a and the end surface 3400e is set to be a sufficiently small value of, for example, 100 nm or less. In the thermally-assisted magnetic recording according to the present invention, the near-field light generating end surface 36a functions as a main heating action part, and the end surface 3400e functions as a writing action part. Therefore, by setting the distance $D_{N-P}$ in the above-described way, write field with sufficiently large gradient can be applied to a portion of the recording layer of the magnetic disk, which has been sufficiently heated. This enables a stable thermally-assisted write operation to be securely achieved.

Furthermore, in the present embodiment, the near-field light generating end surface 36a has a shape of isosceles triangle on the head part end surface 2210, having a bottom edge 361a on the trailing side (+Z side) and an apex on the leading side (−Z side) that is an end 360a of the propagation edge 360. The height $T_{NF2}$ of the near-field light generating end surface 36a (the thickness of the surface plasmon antenna 36 on the head part end surface 2210) is preferably 30 nm or less, and more preferably 20 nm or less. Thereby, the near-field-light emitting position on the end surface 36a can become close to the edge 361a on the trailing side, that is, closer to the end surface 3400e of the main magnetic pole 3400.

Further, a distance $D_{W-P}$ between the waveguide 35 and the main magnetic pole 3400 is made sufficiently large while the distance $D_{N-P}$ is set to a minute value as described above. That is, with the structure according to the present invention shown in FIG. 4 and FIG. 5a, the waveguide 35 can be sufficiently separated apart from the main magnetic pole 3400 and the main pole body 3401. Resultantly, there can be avoided such a situation in which a part of the laser light is absorbed into the main magnetic pole 3400 or the main pole body 3401 made of metal and the amount of light to be converted into near-field light is reduced.

Referring also to FIG. 5a, in the present embodiment, the end surface 350 of the waveguide 35, which is in the leading side (−Z side) of the end surface 36a, has an engraved portion 540 with V-shape corresponding to the groove 54. And the near-field light generating end surface 36a is fitted in the engraved portion 540 in such a way that the end surface 36a and the engraved portion 540 sandwich the end surface 50a of the buffering portion 50 therebetween and the apex 360a is at the forefront of the end surface 36a. The groove 54 formed in the side surface 354 of the waveguide 35 extends to the neighborhood of the near-field light generating end surface 36a, with the propagation edge 360 of the surface plasmon antenna 36 embedded within the groove 54.

Further, in the embodiment shown in FIG. 5b, the groove 54 is positioned in the center in the track width direction (Y-axis direction) of the side surface 354 that is the upper surface of the waveguide 35, and the cross-section of the groove 54 has a V-shape in which the groove is engraved toward the intensity center 530 of waveguide light propagating within the waveguide 35. Here, the intensity center 530 is a center of intensity distribution before the groove 54 is formed in the waveguide. The propagation edge 360, out of portions of the surface plasmon antenna 36, is located at the closest position to the intensity center 530 in the groove 54. That is, the propagation edge 360 is located at the position in which the edge 360 can be coupled with the most amount of waveguide light in a surface plasmon mode. Alternatively, as shown in FIG. 5c, the propagation edge 360 may be positioned near and directly above the groove 54', the edge 360 being opposed to the wall surfaces 54a' and 54b' of the groove 54' with a predetermined distance. Here, "directly above" the groove 54' means: toward a direction that is perpendicular to the side surface 354 in which the groove 54' is formed, and is being apart away from the groove 54'.

As described above, by embedding a portion including the propagation edge 360 of the surface plasmon antenna 36 into the groove 54 or locating the portion directly above the groove 54', as much amount as possible of waveguide light 53 (FIG. 4) propagating through a waveguide 35 can be coupled with the surface plasmon antenna 36 (propagation edge 360) in a surface plasmon mode, and thus the light use efficiency of the near-field light generating element is improved. As explained later with use of practical examples, the depth $D_{GR}$ (FIGS. 5b and 5c) below the side surface 354 of the groove 54 is preferably in the range from 10 to 340 nm. Further, the distance $D_{EG}$ (FIGS. 5b and 5c) between the propagation edge 360 and the bottom of the groove 54 or 54' can be set to be, for example, in the range from 10 to 250 nm. These settings enable the near-field light generating element including the waveguide 35, the buffering portion 50 and the surface plasmon antenna 36 to achieve high light use efficiency of 10% (percent) or more. Further, the groove 54 or 54' and the propagation edge 360 extend to the head part end surface 2210, while the propagation edge 360 being embedded into the groove 54 or being located directly above the groove 54'. In this configuration, surface plasmon, which propagates through the propagation edge 360 and reaches the end surface 36a, can propagates without significantly changing its wavenumber $K_{SP}$ on the edge portions 3601 and 3600 and on their boundary, which leads to a less propagation loss.

Figure 6A:
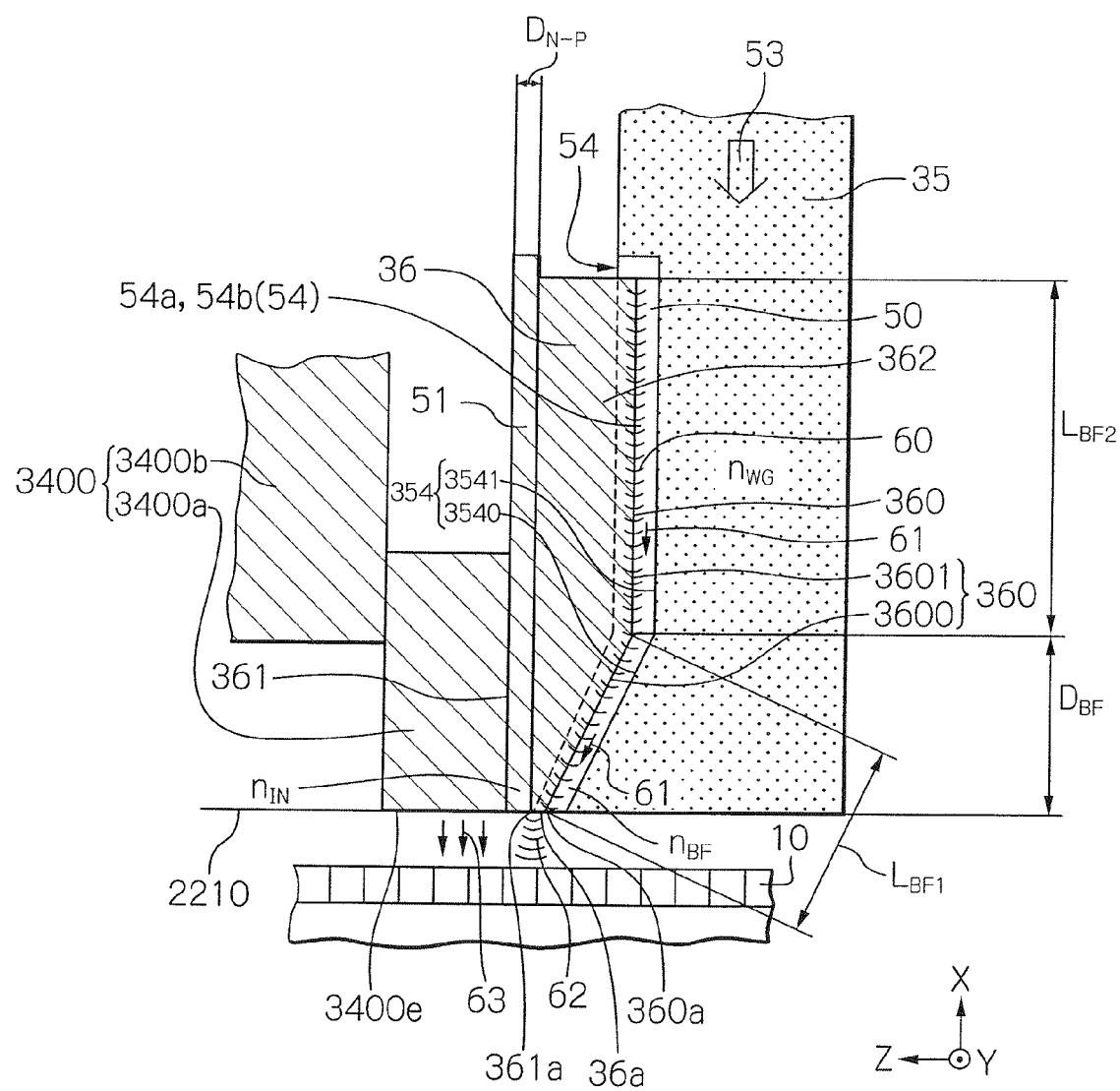
FIGS. 6a to 6d show schematic diagrams for explaining the thermally-assisted magnetic recording utilizing the surface plasmon mode according to the present invention.
Figure 6B:
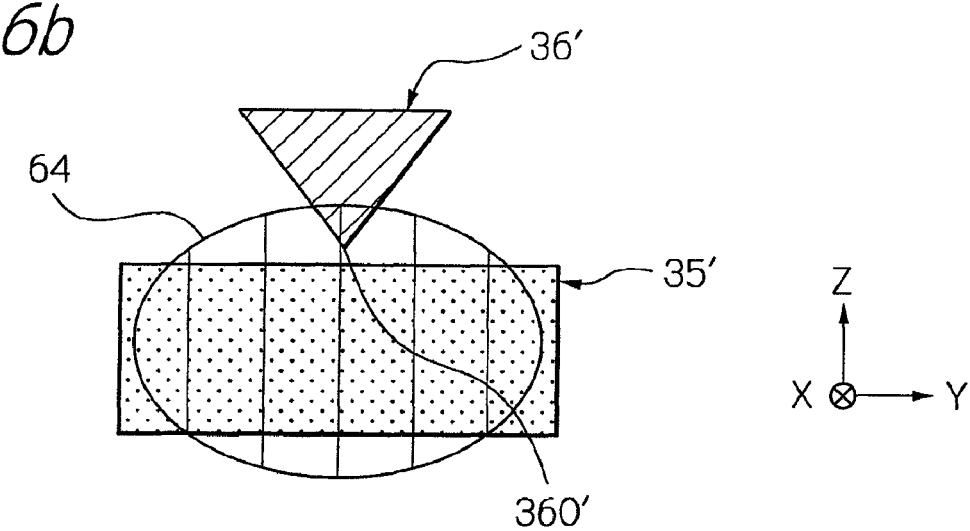
Figure 6C:
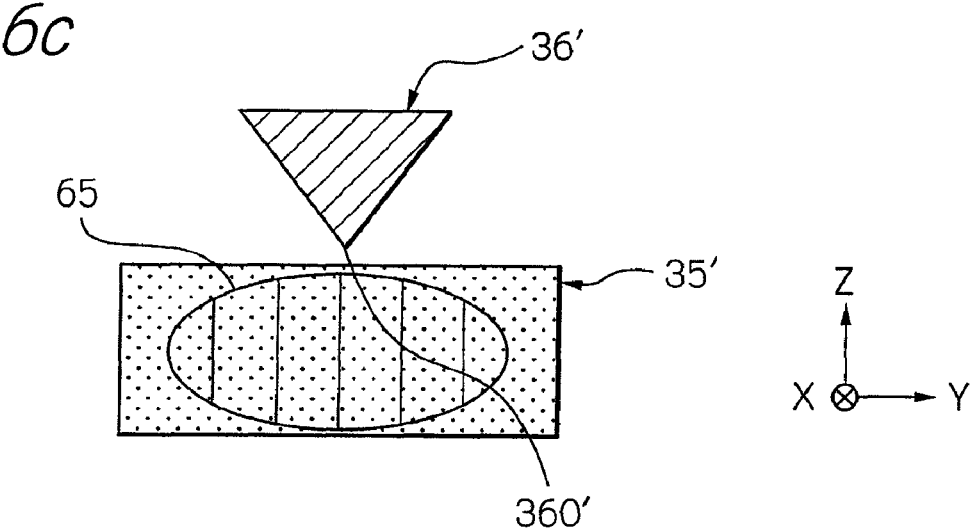
Figure 6D:
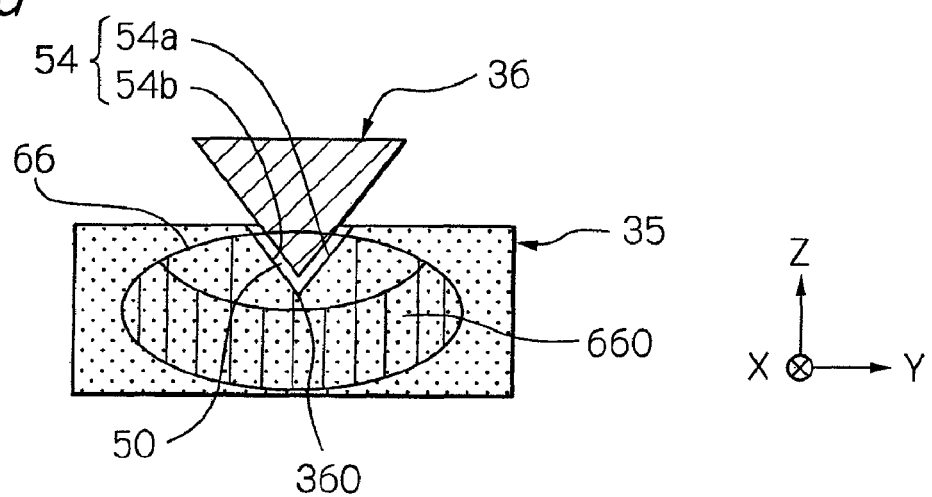

FIGS. 6a to 6d show schematic diagrams for explaining the thermally-assisted magnetic recording utilizing the surface plasmon mode according to the present invention. FIG. 6a shows cross-sections, taken by ZX plane including the centerline of the groove 54, of the near-field light generating element and the main magnetic pole. And FIGS. 6b to 6d are cross-sections taken by YZ plane of the near-field light generating element.

Referring to FIG. 6a, when the electromagnetic transducer 34 writes data onto the recording layer of the magnetic disk 10, first, laser light 53 emitted from the laser diode 40 of the light source unit 23 propagates through the waveguide 35. Next, the waveguide light 53, which has advanced to near the buffering portion 50, couples with the optical configuration including the waveguide 35 with a refractive index $n_{WG}$, the buffering portion 50 with a refractive index $n_{BF}$ and the surface plasmon antenna 36 made of conductive material such as metal, and induces the surface plasmon mode on the propagation edge 360 of the surface plasmon antenna 36. That is, the waveguide light couples with the surface plasmon antenna 36 in the surface plasmon mode. Setting the refractive index $n_{BF}$ of the buffering portion 50 to be smaller than the refractive index $n_{WG}$ of the waveguide 35 ($N_{BF} < N_{WG}$) enables this surface plasmon mode to be induced. Actually, evanescent light is excited within the buffering portion 50 based on an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short.

Hereinafter, the effect on the surface plasmon excitement, brought about by providing the groove 54 according to the present invention in the waveguide 35, will be explained with reference to FIGS. 6b to 6d. According to FIG. 6b, in the case that there is no groove in the waveguide 35', the distribution range 64 of waveguide light propagating through the waveguide 35' has to be located so as to run off the waveguide 35'. Here, the distribution range 64 is, for example, a range in which the light intensity is reduced to $e^{-2}$ (e: base of natural logarithm) of the maximum intensity in the light intensity distribution within the waveguide 35' as a standard. And the surface plasmon antenna 36' is provided so that the propagation edge 360' is located within the distribution range 64. This enables the effective excitation of surface plasmon on the propagation edge 360'. However, in such optical condition that the refractive index of the waveguide 35' is set to be rather higher, the distribution range for the waveguide light becomes smaller; thus the range may fall into the inside of the waveguide 35', as the distribution range 65 shown in FIG. 6c. In this case, it becomes difficult to excite a sufficiently large amount of surface plasmon on the propagation edge 360'.

On the contrary, in the case according to the present invention that the groove 54 is provided in the waveguide 35 as shown in FIG. 6d, the propagation edge 360 can be embedded into the groove 54 and positioned so as to be opposed to the wall surfaces 54a and 54b of the groove 54. In this case, the propagation edge 360 is surrounded by more constituent material of the waveguide 35 than the propagation edge 360' shown in FIGS. 6b and 6c is. That is, the propagation edge 360 is located in the position where the edge 360 is closer to the intensity center of waveguide light and more amount of waveguide light can be coupled with the edge 360 in a surface plasmon mode. Especially, the propagation edge 360 can be coupled with a portion of waveguide light existing in the propagation region 66 that is located on the lower side in the waveguide 35. In this case, a sufficiently large amount of surface plasmon can be excited on the propagation edge 360, even in the case that the distribution range of waveguide light falls within the waveguide 35 as the distribution range 66 shown in FIG. 6d. As a result, the light use efficiency of the near-field light generating element can be improved. In addition, the propagation edge 360 is just an edge where electric field tends to converge and thus surface plasmon can easily be excited. However, as described later, the surface plasmon antenna may alternatively have a propagation surface on which surface plasmon is excited and propagates. Further, in the case that the propagation edge 360 is not embedded in the groove 54, but is disposed near and directly above the groove 54, the propagation edge 360 can be located in the position where the edge 360 is closer to the intensity center of waveguide light and more amount of waveguide light can be coupled with the edge 360 in a surface plasmon mode.

Returning to FIG. 6a, in the above described induced surface plasmon mode, surface plasmon 60 is excited on the propagation edge 360 of the plasmon antenna 36, and propagates in the direction shown by arrows 61 on the edge 360. The propagation of the surface plasmon 60 can occur under the condition that the propagation edge 360 is covered with the buffering portion 50 having a refractive index $n_{BF}$ equal to or higher than a refractive index $n_{IN}$ of the material covering the end surface 361 of the surface plasmon antenna 36 on the side opposite to the edge 360. It is known to be preferable in practice to satisfy the relation of refractive index $n_{BF}$=refractive index $n_{IN} \times 1.5$.

By the above-described propagation of the surface plasmon 60, the surface plasmon 60, namely, electric field converges on the near-field light generating end surface 36a that reaches the head part end surface 2210 and includes the apex 36a that is the destination of the propagation edge 360. As a result, near-field light 62 is emitted from the near-field light generating end surface 36a. The near-field light 62 is radiated toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, a thermally-assisted magnetic recording can be achieved.

In the magnetic recording, by adjusting the shape and size of the near-field light generating end surface 36a on the head part end surface 2210, the emitting position of near-field light 62 on the end surface 36a can be set to be closer to the first main pole portion 3400a on the trailing side (on the edge 361a side). In the case, write field with sufficiently large gradient can be applied to a portion of the magnetic recording layer of the magnetic disk 10, which has been sufficiently heated. This enables a stable thermally-assisted write operation to be securely achieved.

Further, in a conventional case in which a plasmon antenna provided on the end surface of a head is directly irradiated with the laser light propagating through a waveguide, most of the irradiating laser light has been converted into thermal energy within the plasmon antenna. In this case, the size of the plasmon antenna has been set smaller than the wavelength of the laser light, and its volume is very small. Therefore, the plasmon antenna has been brought to a very high temperature, for example, 500° C. (degrees Celsius) due to the thermal energy. On the contrary, in the thermally-assisted magnetic recording according to the present invention, the surface plasmon mode is used, and the near-field light 62 is generated by propagating the surface plasmon 60 toward the head part end surface 2210. This brings the temperature at the near-field light generating end surface 36a to, for example, about 100° C. during the emission of near-field light, which is greatly reduced compared to the conventional. This reduction of temperature resultantly allows the protrusion of the near-field light generating end surface 36a toward the magnetic disk 10 to be suppressed; thereby favorable thermally-assisted magnetic recording can be achieved.

Furthermore, the length ($L_{BF1}+L_{BF2}$) of the whole buffering portion 50, that is, the portion through which the waveguide 35 and the surface plasmon antenna 36 are coupled with each other in a surface plasmon mode, is preferably larger than the wavelength $\lambda_L$ of the laser light 53. In this preferable case, the coupled portion has an area markedly larger than a so-called "focal region" in the case that, for example, laser light is converged on a buffering portion 50 and a surface plasmon antenna 36 and coupled in a surface plasmon mode. Therefore, the configuration quite different from the system including such "focal region" can be realized in the present invention; and thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), US patent Publication No. 2005/0249451 A1, and U.S. Pat. No. 7,330,404 B2.

Figure 7A:
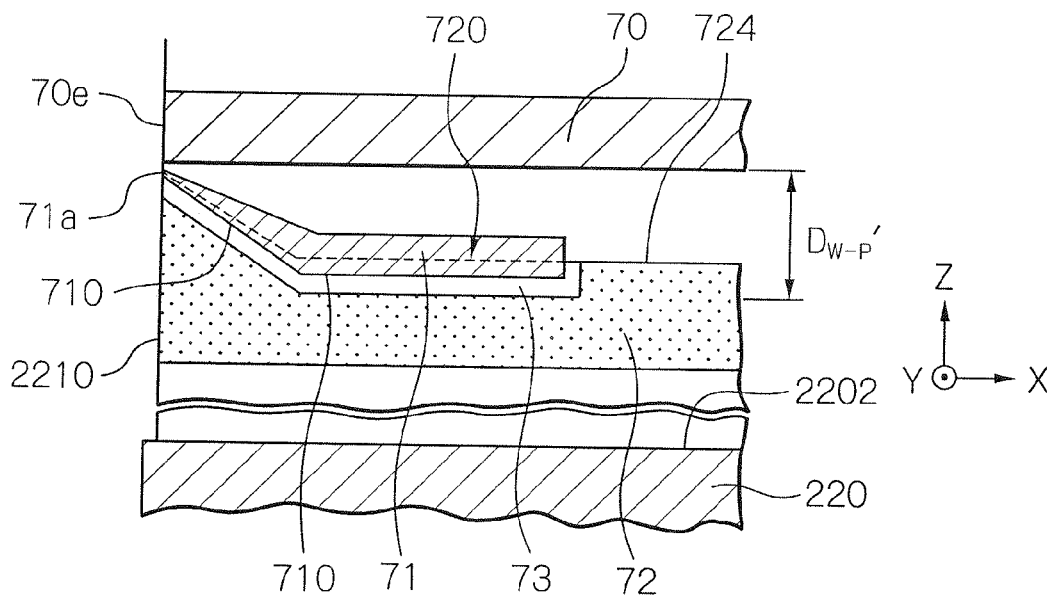

FIGS. 7a to 7f show schematic views illustrating various embodiments regarding the shape and arrangement of the near-field light generating element (the waveguide, the buffering portion and the surface plasmon antenna) and the main magnetic pole according to the present invention. Here, FIG. 7e2 is a cross-section of the near-field light generating element, taken by plane C shown in FIG. 7e1.

Referring to FIG. 7a, a main magnetic pole 70 is one layer extending parallel to the element-formation surface 2202. A portion of a surface plasmon antenna 71 on the head part end surface 2210 side is inclined with respect to the element-formation surface 2202 so as to become closer to the end of the main magnetic pole 70 on the head part end surface 2210 side toward the head part end surface 2210. In addition, both of the groove 720 formed in the side surface of a waveguide 72 and the propagation edge 710 of the surface plasmon antenna 71 embedded into the groove 720 through the buffering portion 73 extend to the head part end surface 2210. That is, a portion on the end surface 71a side of the side surface 724 is opposed to the propagation edge 710 of the surface plasmon antenna 71 with a predetermined distance. In this embodiment, a sufficiently large amount of surface plasmon can be excited on the propagation edge 710. Further, the distance $D_{W-P}'$ in Z-axis direction between the waveguide 72 and the main magnetic pole 70 can be set to a sufficiently large value while the near-field light generating end surface 71a of the surface plasmon antenna 71 is positioned near the end surface 70e of the main magnetic pole 70, on the head part end surface 2210. Resultantly, there can be more reliably avoided such a situation in which a part of the laser light is absorbed into the main magnetic pole and the amount of light to be converted into the near-field light is reduced. As a result, the light use efficiency of the near-field light generating element can be improved.

Figure 7B:
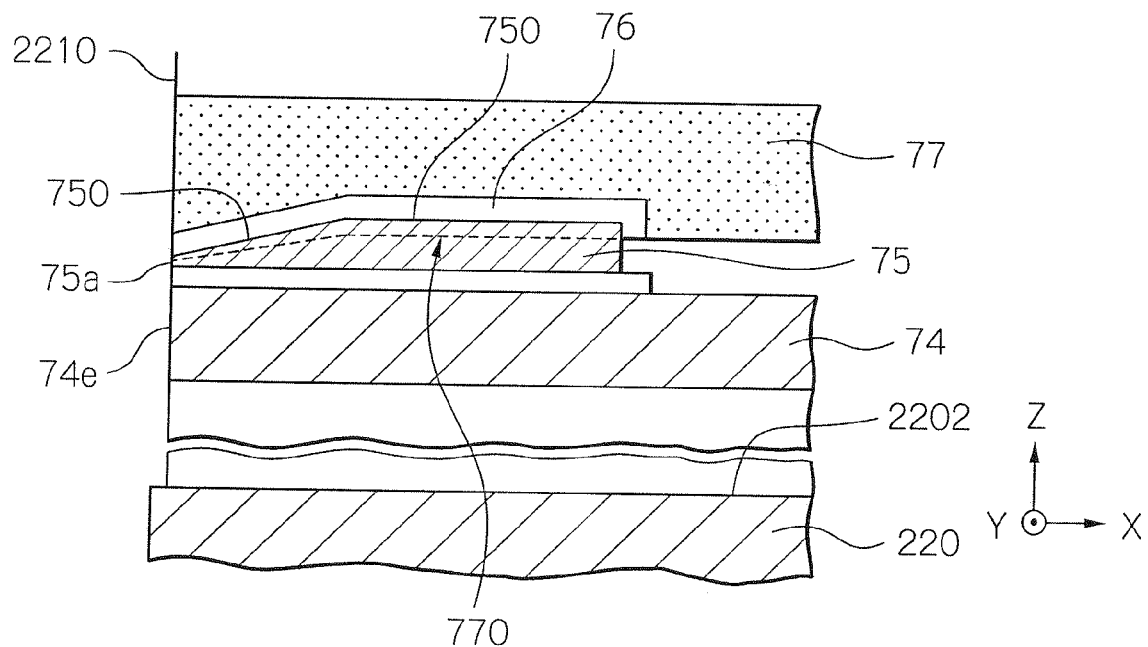

In the embodiment shown in FIG. 7b, a main magnetic pole 74, a surface plasmon antenna 75, a buffering portion 76, and a waveguide 77 are sequentially stacked toward +Z direction, starting from the slider substrate 220 side. A propagation edge 750 for causing surface plasmon to propagate thereon is positioned on the side opposite to the main magnetic pole 74 in the surface plasmon antenna 75, and is embedded through the buffering portion 76 into the groove 770 provided in the side surface of the waveguide 77. Further, both of the propagation edge 750 and the groove 770 extend to the head part end surface 2210. Consequently, the near-field light generating end 75a is located in the trailing side (+Z side) of the end surface 74e of the main magnetic pole 74, on the head part end surface 2210. Also in this embodiment, a sufficiently large amount of surface plasmon can be excited on the propagation edge 750. As a result, the light use efficiency of the near-field light generating element can be improved. Further, the near-field light generating end 75a can be positioned sufficiently near the end surface 74e of the main magnetic pole 74, and write field having a sufficiently large gradient can be applied to a sufficiently heated portion of the magnetic recording layer of a magnetic disk.

Figure 7C:
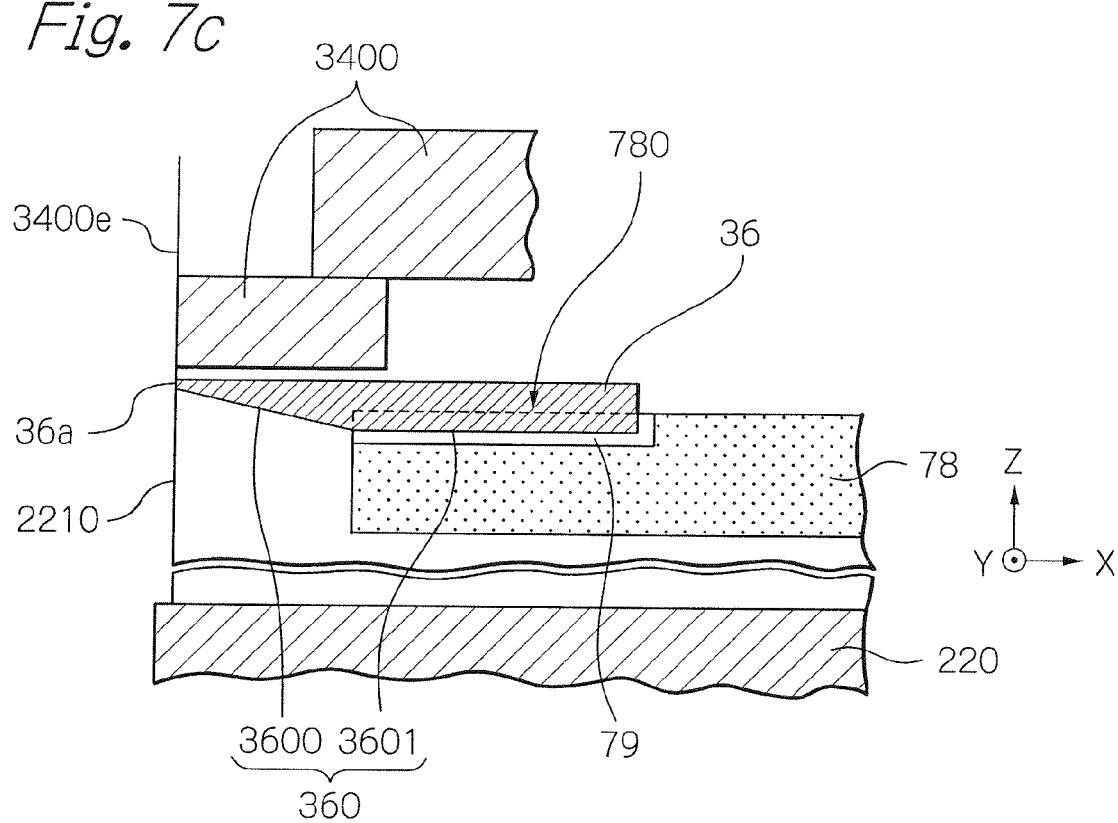

According to FIG. 7c, in the present embodiment, the waveguide 78 and the groove 780 formed in the side surface of the waveguide 78 do not reach the head part end surface 2210. And in the propagation edge 360 of the near-field light generating element 36, only a portion 3601 is embedded into the groove 780 through the buffering portion 79. Even with this configuration, surface plasmon excited on the portion 3601 of the edge 360 reaches the near-filed light generating end surface 36a by propagating the inclined portion 3600 of the edge 360. As a result, near-field light for thermal assist can be generated. Alternatively, an embodiment in which only a part of the portion 3601 of the propagation edge 360 is embedded into the groove 780 through the buffering portion 79, can be possible.

Figure 7D:
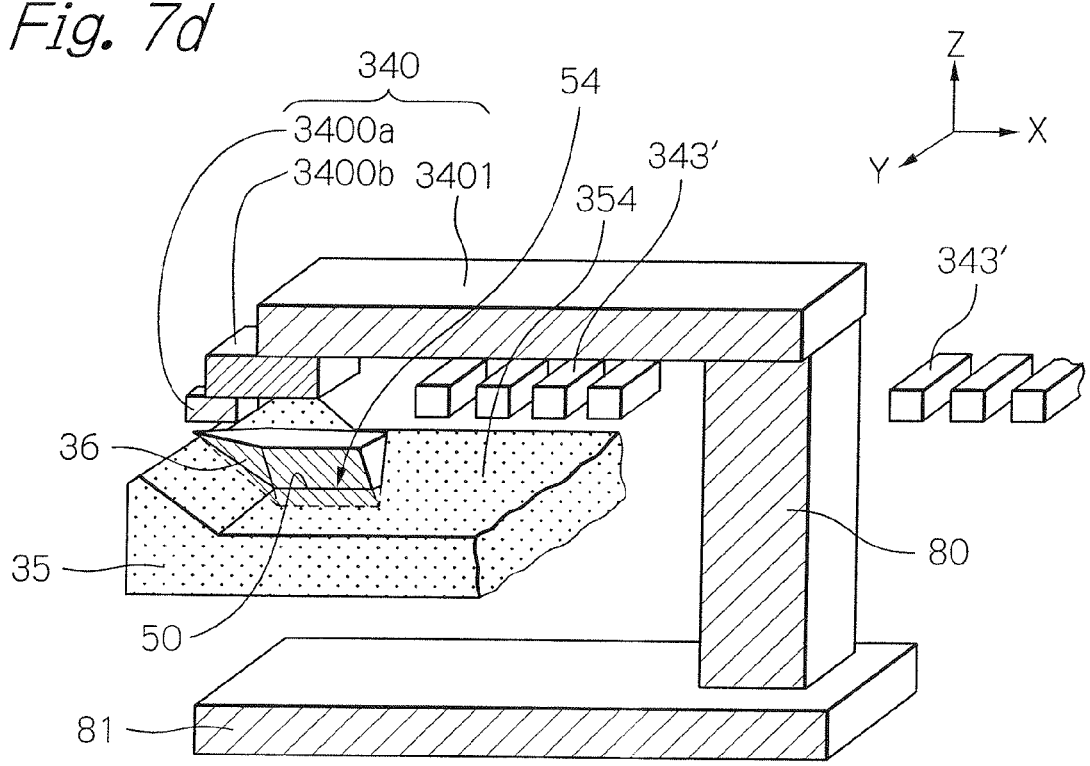

In the embodiment shown in FIG. 7d, the configuration of a waveguide 35, a groove 54 provided in the side surface 354 of the waveguide, a buffering portion 50, a surface plasmon antenna 36 and a main magnetic pole layer 340 is the same as that shown in FIGS. 3 and 4. However, a write shield layer 81, which is a return yoke for receiving a magnetic flux returned from a magnetic disk, is provided in the side opposite to the main magnetic pole layer 340 in relation to the waveguide 35 and surface plasmon antenna 36, that is, in the leading side (in −Z side) of the waveguide 35 and surface plasmon antenna 36. The write shield layer 81 and the main magnetic pole layer 340 are magnetically connected with each other through a back contact portion 80. Further, a write coil layer 343' is formed so as to pass through in one turn at least between the main magnetic pole layer 340 and the write shield layer 81, and has a spiral structure with the back contact portion 80 as a center. Also in this embodiment, favorable thermally-assisted magnetic recording can be performed by using the surface plasmon according to the present invention.

In the embodiment shown in FIG. 7e1, a surface plasmon antenna 84 includes: a near-field light generating end surface 84a where near-field light is generated; and a propagation surface 840 for propagating surface plasmon excited by waveguide light propagating through a waveguide 82. The propagation surface 840 may be a planer or curved surface. A groove 820 is formed in the side surface 824, which is the upper surface of the waveguide 82, and a portion, including the propagation surface 840, of the surface plasmon antenna 84 is embedded into the groove 820. Further, Both of the propagation surface 840 and the groove 820 extend to the head part end surface 2210. As shown in FIG. 7e2, the cross-section of the groove 820 has a shape fitted to the cross-section shape of the surface plasmon antenna 84 near the propagation surface 840. The groove 820 has wall surfaces 820*a* and 820*b*, and a bottom surface 820*c*. As described heretofore, the cross-section of a groove according to the present invention can have a rectangular shape, a trapezoidal shape, a U-shape, or the like. Further, the propagation surface 840 of the surface plasmon antenna 84 is opposed to the bottom surface 820*c* through the buffering portion 83 that has a refractive index $n_{BF}$ lower than the refractive index $n_{WG}$ of the waveguide 82. Thereby, light propagating through the waveguide 82 can be coupled with the surface plasmon antenna 84 in a surface plasmon mode. As a result, surface plasmon generated on the propagation surface 840 propagates through the surface 840 and reaches the near-field light generating end surface 84*a*. Here, portions of the side surfaces 841 and 842 opposed to the wall surfaces 820*a* and 820*b* through the buffering portion 83 can be portions where surface plasmon can be excited and propagate, the side surfaces 841 and 842 being other than the propagation surface 840 of the surface plasmon antenna 84. As describe above, also in this embodiment, favorable thermally-assisted magnetic recording can be performed by using the surface plasmon according to the present invention.

Figure 7F:
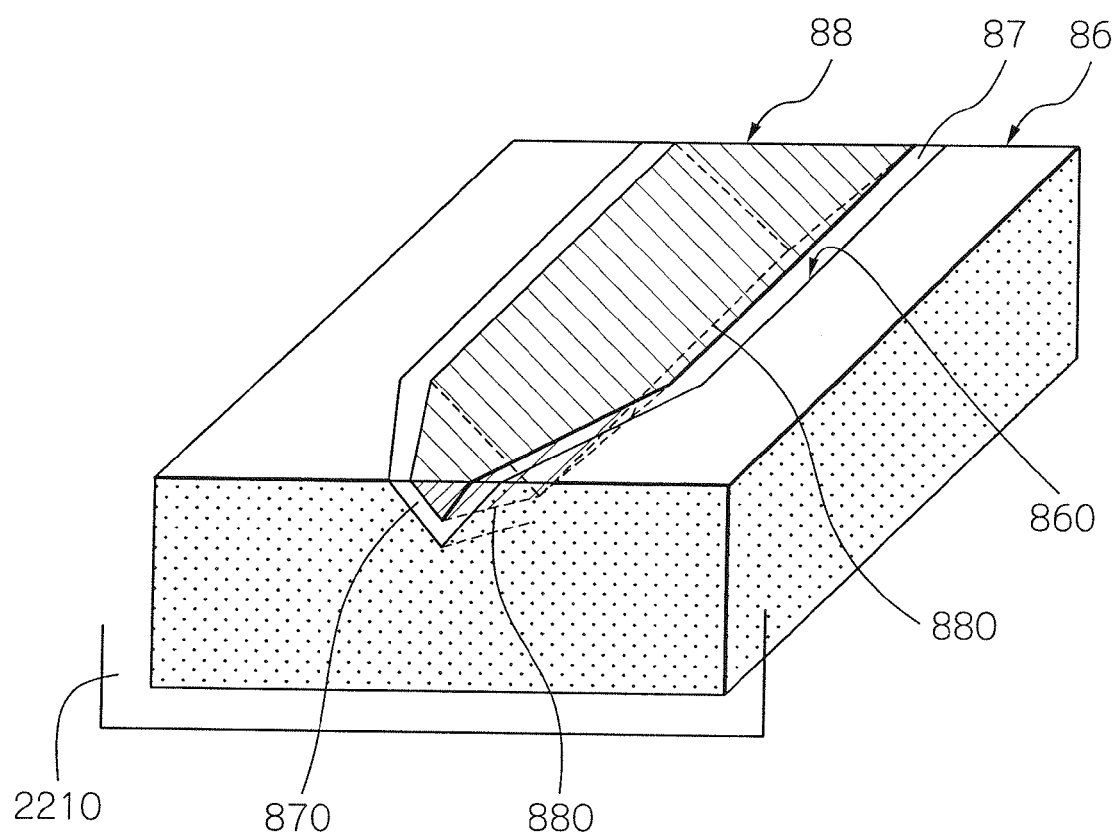

In the embodiment shown in FIG. 7*f*, a groove 860 is formed in the side surface of a waveguide 86, and the whole surface plasmon antenna 88 including the propagation edge 880 is embedded into the groove 860 through a buffering portion 87. Also in this embodiment, favorable thermally-assisted magnetic recording can be performed by using the surface plasmon according to the present invention. Alternatively, configurations in which the surface plasmon antennas 71, 75, 36, 36 and 88 include propagation surfaces that are embedded into grooves provided in the side surfaces of the waveguides 72, 77, 35, 78 and 86 instead of the propagation edges 710, 750, 360, 360 and 880 respectively, are within the scope of the present invention.

Figure 8:
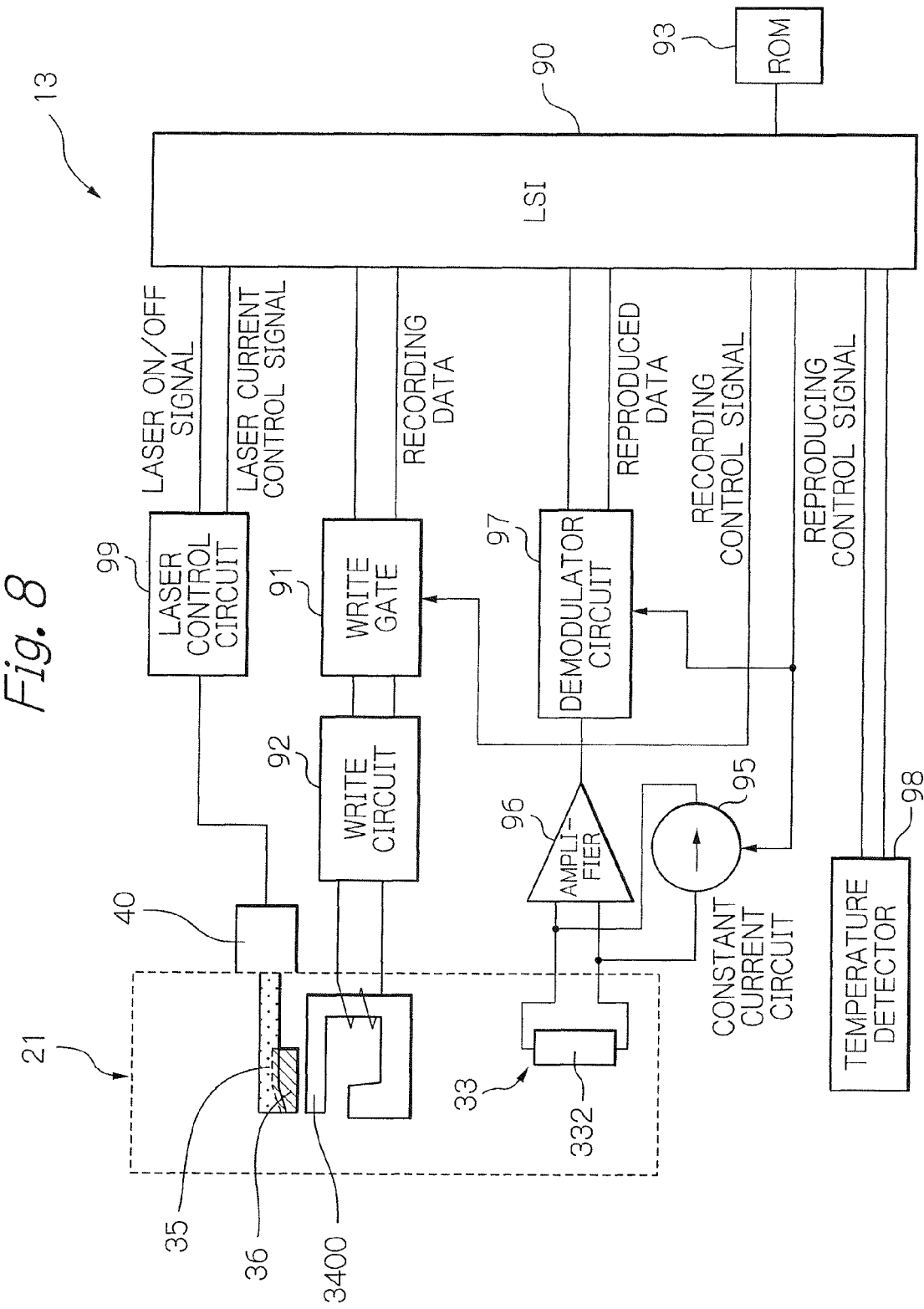
FIG. 8 shows a block diagram illustrating the circuit structure of the recording/reproducing and light-emission control circuit of the magnetic disk apparatus shown in FIG. 1.

FIG. 8 shows a block diagram illustrating the circuit structure of the recording/reproducing and light-emission control circuit 13 of the magnetic disk apparatus shown in FIG. 1.

In FIG. 8, reference numeral 90 indicates a control LSI, 91 indicates a write gate for receiving recording data from the control LSI 90, 92 indicates a write circuit, 93 indicates a ROM that stores a control table or the like for controlling the value of drive current supplying to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk by write field generated from the main magnetic pole 3400.

A constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

The laser control circuit 99 receives a laser ON/OFF signal and a drive current control signal, which are outputted from the control LSI 90. When the laser ON/OFF signal is an ON operation instruction, a drive current of an oscillation threshold value or more flows into the laser diode 40. Thereby, the laser diode 40 emits light; then the laser light propagates through the waveguide 35 and couples with the surface plasmon antenna 36 in the surface plasmon mode. As a result, near-field light is generated from the end of the surface plasmon antenna 36, reaches the magnetic recording layer of the magnetic disk, and heats the magnetic recording layer. The value of drive current in this occasion is controlled to a value corresponding to the drive current control signal. The control LSI 90 generates the laser ON/OFF signal with its timing adjusted according to recording/reproducing operations, and determines the value of drive current control signal, by referring the temperature value in the magnetic recording layer of the magnetic disk or the like, which is measured by the temperature detector 98, based on the control table in the ROM 93. The control table may include data about the relation between the drive current value and the mount of temperature increase by thermal-assist operation in the magnetic recording layer, and data about the temperature independence of the anisotropic field (coercive force) of the magnetic recording layer, as well as the temperature dependences of the oscillation threshold and the characteristics of light output vs. drive current. Thus, it is possible to realize not only a current application to the laser diode 40 linked simply with the recording operation but also more diversified current application modes, by providing the system of the laser ON/OFF signal and drive current control signal independently from the recording/reproducing control signal system.

Obviously, the circuit structure of the recording/reproducing and light-emission control circuit 13 is not limited to that shown in FIG. 8. It is also possible to specify write and read operations by using a signal other than the recording control signal and reproducing control signal.

Hereinafter, practical examples will be described, in which the generation of near-field light in a near-field light generating element (including a surface plasmon antenna with a groove, a buffering portion and a surface plasmon antenna) according to the present invention was analyzed by simulation, and a thermally-assisted magnetic recording was performed to a magnetic recording medium with use of a head provided with the near-field light generating element.

An experiment for the simulation analysis was conducted by using a three-dimensional Finite-Difference Time-Domain (FDTD) method, which is an electromagnetic field analysis technique. The simulation analysis experiment was conducted on a system which was an area including: a head part 221 including a waveguide 35 with a groove 54, a buffering portion 50, a surface plasmon antenna 36, a main magnetic pole 3400, and an overcoat layer 38; and an air layer (with a refractive index n=1) covering the head part end surface 2210, shown in FIG. 4 and FIGS. 5*a* and 5*b*. Laser light entering the waveguide 35 was a Gaussian beam with a wavelength $\lambda_L$ of 650 nm, having TM polarization (in which the oscillation direction of electric field of the laser light is perpendicular to the layer surface of the waveguide 35, that is, in Z-axis direction). The intensity $I_{IN}$ of the laser light was 655 $(V/m)^2$.

The waveguide 35 had a width $W_{WG2}$ (FIGS. 4 and 5*b*) of 0.8 μm and a thickness $T_{WG}$ (FIGS. 4 and 5*b*) of 0.4 μm, and was formed of $Ta_2O_5$ (with a refractive index n=2.15). The surface plasmon antenna 36 had a width $W_{NF}$ (FIG. 4) of 0.85

μm and a thickness $T_{NF1}$ of 0.3 μm, and was formed of Ag (in which the real part of the refractive index was 0.134, and the imaginary part was 4.135). In the surface plasmon antenna 36, the distance $D_{BF}$ (FIG. 4) between the near-field light generating end surface 36a and the position from which the surface plasmon antenna 36 begins to taper was 0.7 μm, and the whole length $H_{NF}$ (FIG. 4) (in X-axis direction) was 2.5 μm. The apex angle $θ_{NF}$ (FIG. 5a) of the apex 360a in the near-field light generating end surface 36a was 110° (degrees), and the height $T_{NF2}$ (FIG. 5) was 20 nm. Further, the distance $D_{N-P}$ (FIG. 5a) on the end surface 2210 between the end surface 36a and the end surface 3400e of the main magnetic pole 3400 was 50 nm. The overcoat layer 38 was formed of $Al_2O_3$ (with a refractive index n=1.65), and the buffering portion 50 was a portion of the overcoat layer 38. That is, the refractive index $n_{BF}$ of the buffering portion 50 was 1.65.

The depth $D_{GR}$ (FIG. 5b) of the groove 54 formed in the waveguide 35 was varied in the range of 50 to 400 nm. After forming the groove 54, the near-field light generating element was constructed by embedding the propagation edge 360 of the surface plasmon antenna 36 into the groove 54 through the buffering portion 50 or by locating the edge 360 directly above the groove 54 through the buffering portion 50. The distance $D_{EG}$ (FIGS. 5b and 5c) between the propagation edge 360 and the bottom of the groove 54 was 50 nm. And the end surface 3400e (FIG. 5a) of the main magnetic pole 3400 had a shape of a trapezoid having a short-edge length of 100 nm on the surface plasmon antenna 36 side, a long-edge length of 195 nm on the opposite side, and a height of 300 nm. The main magnetic pole 3400 was formed of FeCo (in which the real part of the refractive index was 2.87, and the imaginary part was 3.63).

(Relationship between the Depth $D_{GR}$ of the Groove 54 and the Light Use Efficiency)

Under the experimental conditions described above, the relationship between the depth $D_{GR}$ (FIG. 5b) of the groove 54 formed in the waveguide 35 and the light use efficiency of the near-field light generating element was determined by simulation. Here, the light use efficiency of the near-field light generating element is given by $I_{OUT}/I_{IN}(×100)$, where $I_{IN}$ is the intensity of laser light 53 incident to the waveguide 35, and $I_{OUT}$ is the intensity of near-field light emitted from the near-field light generating end surface 36a after converting the laser light into surface plasmon in the surface plasmon antenna 36.

Table 1 shows the result of the determinations by the simulation of the relationship between the depth $D_{GR}$ (FIG. 5b) of the groove 54 and the light use efficiency. Further, FIG. 9 shows a graph illustrating the relationship between the depth $D_{GR}$ of the groove 54 and the light use efficiency shown in Table 1. Here, each of Table 1 and FIG. 9 also shows the relationship between the ratio $D_{GR}/T_{WG}$ of the depth $D_{GR}$ to the thickness $T_{WG}$ (400 nm) of the waveguide 35 and the light use efficiency.

TABLE 1

| | Depth of groove 54 $D_{GR}$ (nm) | | | | | | |
|---|---|---|---|---|---|---|---|
| | 10 | 50 | 150 | 230 | 280 | 340 | 400 |
| $D_{GR}/T_{WG}$ | 0.025 | 0.25 | 0.5 | 0.575 | 0.7 | 0.85 | 1 |
| Light use efficiency (%) | 10.1 | 11.7 | 14.0 | 15.4 | 13.9 | 9.9 | 6.2 |

Referring to Table 1 and FIG. 9, in the case that the depth $D_{GR}$ of the groove 54 is 10 nm or more, and 340 nm or less, the light use efficiency of 10% or more is obtained, which is required for achieving favorable thermally-assisted magnetic recording in the manufacturing field of the heads. This corresponds to the case that the ratio $D_{GR}/T_{WG}$ of the depth $D_{GR}$ to the thickness $T_{WG}$ (400 nm) of the waveguide 35 is 0.025 or more, and 0.85 or less. The setting of the depth $D_{GR}$ of the groove 54 to be a sufficiently large value of 10 nm or more enables the propagation edge 360 to intrude into the waveguide 35 more deeply, thereby to be coupled with more amount of waveguide light in the surface plasmon mode. Whereas, the setting of the depth $D_{GR}$ of the groove 54 to be a small value of 340 nm or less enables the increase in propagation loss of the waveguide 35 due to the existence of the groove 54 to fall within the allowable range in which a high rate of 10% or more in the light use efficiency can be secured. Accordingly, it is understood from the practical examples that: the depth $D_{GR}$ of the groove 54 is preferably 10 nm or more, and 340 nm or less; and the ratio $D_{GR}/T_{WG}$ of the depth $D_{GR}$ to the thickness $T_{WG}$ is preferably 2.5% or more, and 85% or less.

(Thermally-Assisted Magnetic Recording with Use of a Bit-Patterned Medium)

Hereinafter, a practical example will be described below, in which a thermally-assisted magnetic recording was performed to a bit-patterned medium by simulation, with use of a thermally-assisted magnetic recording head provided with the near-field light generating element used in the above-described practical examples.

Figure 10A:
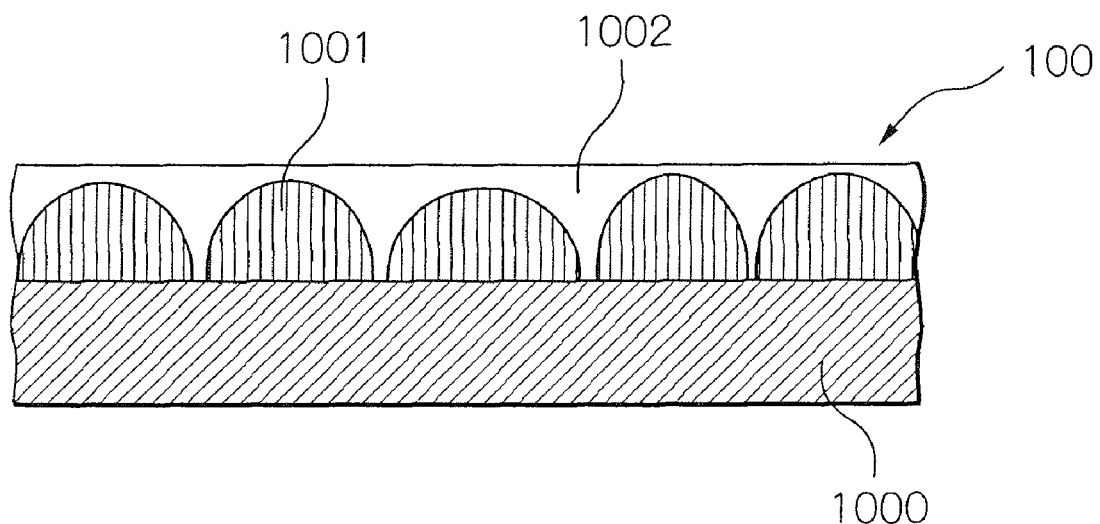
FIGS. 10a and 10b show a cross-sectional view and a top view, respectively, schematically illustrating the structure of the bit-patterned medium used in the practical example.
Figure 10B:
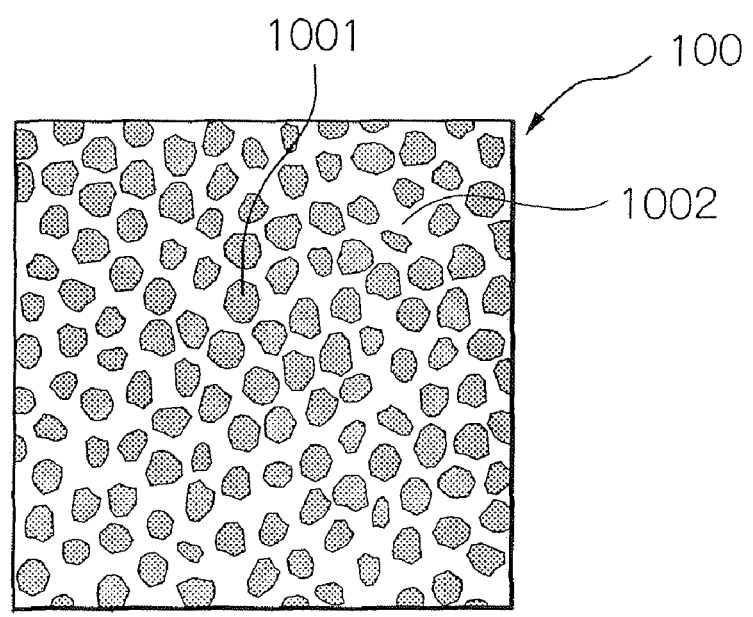

FIGS. 10a and 10b show a cross-sectional view and a top view, respectively, schematically illustrating the structure of the bit-patterned medium used in the practical example.

As shown in FIGS. 10a and 10b, the bit-patterned medium 100 used in the practical example included: a number of dots 1001 for constituting record bits, formed on a glass substrate 1000; and a protective film 1002 formed on the glass substrate 1000 so as to cover the dots 1001. Each dot 1001 was formed of a multilayer of (Co(0.3 nm)/Pd(0.7 nm))×20 layers. The protective film 1002 was formed of C (carbon). The magnetic anisotropy energy $K_U$ of the bit-patterned medium 100 was $1.0×10^6$ J/m³ ($1.0×10^7$ erg/m³) at room temperature, and the saturation magnetic flux density was approximately 500 emu/cc at room temperature. The coercive force $H_C$ of the bit-patterned medium 100 was 20 kOe (oersteds) at 50° C., 14 kOe at 150° C., 7 kOe at 300° C., and 0 kOe at approximately 400° C. (=$T_C$). Further, in FIG. 10b, the size (diameter) of the dot 1001 was approximately 20 nm, and the pitch (distance) between adjacent dots 1001 was approximately 30 nm.

Then, a thermally-assisted magnetic recording was performed to the above-described bit-patterned medium 100 by simulation, with use of the above-described thermally-assisted magnetic recording head. The result is that the temperature of a portion to be written of the bit-patterned medium 100 increased by approximately 300° C. From the result, it has been confirmed that the thermally-assisted magnetic recording can be achieved on the bit-patterned medium with dot size of 20 nm.

As described above, it is understood that, according to the present invention, a near-field light generating element is provided, in which as much amount as possible of waveguide light can be coupled with a plasmon antenna in a surface plasmon mode, and thus the light use efficiency is improved. Further, it is also understood that, according to the present invention, provided is a thermally-assisted magnetic recording head capable of appropriately heating the write position on the magnetic recording medium. Accordingly, the present invention can achieve favorable thermally-assisted magnetic recording, and contribute to the achievement of higher recording density, for example, exceeding 1 Tbits/in².

All the foregoing embodiments are by way of example of the present invention only and not intended to be limiting, and many widely different alternations and modifications of the present invention may be constructed without departing from the spirit and scope of the present invention. Especially, the near-field light generating element utilizing the surface plasmon mode according to the present invention can be applied to optical devices with greatly minute optical paths such as ultra-high-speed light modulation devices. Accordingly, the present invention is limited only as defined in the following claims and equivalents thereto.

The invention claimed is:

1. A near-field light generating element comprising:
   a waveguide through which a light for exciting surface plasmon propagates; and
   a plasmon antenna comprising: a near-field light generating end for emitting near-field light; and a propagation surface or a propagation edge for causing surface plasmon excited by the light to propagate thereon, extending to said near-field light generating end,
   a groove being formed in a side surface of said waveguide, and at least a portion of said propagation surface or said propagation edge being embedded in said groove or being located directly above said groove, said at least a portion being opposed to a wall surface or a bottom surface of said groove with a predetermined distance, so as for the light propagating through said waveguide to be coupled with said plasmon antenna in a surface plasmon mode.

2. The near-field light generating element as claimed in claim 1, wherein said at least a portion of said propagation surface or said propagation edge of said plasmon antenna is opposed to the wall surface or the bottom surface of said groove through a buffering portion having a refractive index lower than a refractive index of said waveguide.

3. The near-field light generating element as claimed in claim 2, wherein said buffering portion has a refractive index equal to or higher than a refractive index of a material covering an end surface of said plasmon antenna, said end surface being opposite to said propagation surface or said propagation edge.

4. The near-field light generating element as claimed in claim 2, wherein said buffering portion is a portion of an overcoat layer formed so as to cover said waveguide.

5. The near-field light generating element as claimed in claim 1, wherein said at least a portion of said propagation surface or said propagation edge of said plasmon antenna is positioned most deeply in said groove.

6. The near-field light generating element as claimed in claim 1, wherein said plasmon antenna comprises said propagation edge, and said groove is an engraved portion with a V-shaped cross-section.

7. The near-field light generating element as claimed in claim 1, wherein said groove is formed to extend to the neighborhood of said near-field light generating end, and the whole of said propagation surface or said propagation edge is embedded in said groove or located directly above said groove, the whole of said propagation surface or said propagation edge being opposed to the wall surface or the bottom surface of said groove with a predetermined distance.

8. The near-field light generating element as claimed in claim 1, wherein a depth of said groove below the side surface of said waveguide is 10 nanometers or more, and 340 nanometers or less.

9. The near-field light generating element as claimed in claim 1, wherein a depth of said groove below the side surface of said waveguide is 2.5 percent or more of a thickness of said waveguide, and 85 percent or less of the thickness.

10. The near-field light generating element as claimed in claim 1, wherein said plasmon antenna is formed of one element selected from a group of Pd, Pt, Rh, Ir, Ru, Au, Ag, Cu or Al, or an alloy made of at least two selected from the group.

11. A thermally-assisted magnetic recording head comprising:
    a magnetic pole for generating write field from its end on an opposed-to-medium surface side;
    a waveguide through which a light for exciting surface plasmon propagates; and
    a plasmon antenna comprising: a near-field light generating end for emitting near-field light, reaching the opposed-to-medium surface; and a propagation surface or a propagation edge for causing surface plasmon excited by the light to propagate thereon, extending to said near-field light generating end,
    a groove being formed in a side surface of said waveguide, and at least a portion of said propagation surface or said propagation edge being embedded in said groove or being located directly above said groove, said at least a portion being opposed to a wall surface or a bottom surface of said groove with a predetermined distance, so as for the light propagating through said waveguide to be coupled with said plasmon antenna in a surface plasmon mode.

12. The thermally-assisted magnetic recording head as claimed in claim 11, wherein said waveguide is provided in a side opposite to said magnetic pole in relation to said plasmon antenna.

13. The thermally-assisted magnetic recording head as claimed in claim 12, wherein a portion on the opposed-to-medium surface side of said plasmon antenna is inclined so as to become closer to an end portion on the opposed-to-medium surface side of said magnetic pole toward the opposed-to-medium surface.

14. The thermally-assisted magnetic recording head as claimed in claim 12, wherein a portion on the opposed-to-medium surface side of said magnetic pole is inclined so as to become closer to an end portion on the opposed-to-medium surface side of said plasmon antenna toward the opposed-to-medium surface.

15. The thermally-assisted magnetic recording head as claimed in claim 11, wherein said at least a portion of said propagation surface or said propagation edge of said plasmon antenna is opposed to the wall surface or the bottom surface of said groove through a buffering portion having a refractive index lower than a refractive index of said waveguide.

16. The thermally-assisted magnetic recording head as claimed in claim 15, wherein said buffering portion has a refractive index equal to or higher than a refractive index of a material covering an end surface of said plasmon antenna, said end surface being opposite to said propagation surface or said propagation edge.

17. The thermally-assisted magnetic recording head as claimed in claim 15, wherein said buffering portion is a portion of an overcoat layer formed so as to cover said waveguide.

18. The thermally-assisted magnetic recording head as claimed in claim 11, wherein said at least a portion of said propagation surface or said propagation edge of said plasmon antenna is positioned most deeply in said groove.

19. The thermally-assisted magnetic recording head as claimed in claim 11, wherein said plasmon antenna comprises said propagation edge, and said groove is an engraved portion with a V-shaped cross-section.

20. The thermally-assisted magnetic recording head as claimed in claim 11, wherein said groove is formed to extend to the neighborhood of said near-field light generating end, and the whole of said propagation surface or said propagation edge is embedded in said groove or located directly above said groove, the whole of said propagation surface or said propagation edge being opposed to the wall surface or the bottom surface of said groove with a predetermined distance.

21. The thermally-assisted magnetic recording head as claimed in claim 11, wherein a depth of said groove below the side surface of said waveguide is 10 nanometers or more, and 340 nanometers or less.

22. The thermally-assisted magnetic recording head as claimed in claim 11, wherein a depth of said groove below the side surface of said waveguide is 2.5 percent or more of a thickness of said waveguide, and 85 percent or less of the thickness.

23. The thermally-assisted magnetic recording head as claimed in claim 11, wherein said plasmon antenna is formed of one element selected from a group of Pd, Pt, Rh, Ir, Ru, Au, Ag, Cu or Al, or an alloy made of at least two selected from the group.

24. The thermally-assisted magnetic recording head as claimed in claim 11, wherein a thermal conduction layer is provided between said plasmon antenna and said magnetic pole, so as to cover an end surface of said plasmon antenna, said end surface being opposite to said propagation surface or said propagation edge.

25. A head gimbal assembly comprising: a thermally-assisted magnetic recording head as claimed in claim 11; and a suspension supporting said thermally-assisted magnetic recording head.

26. A magnetic recording apparatus comprising:
at least one head gimbal assembly comprising a thermally-assisted magnetic recording head and a suspension supporting said thermally-assisted magnetic recording head;
at least one magnetic recording medium; and
a recording circuit for controlling write operations which said thermally-assisted magnetic recording head performs to said at least one magnetic recording medium,
said thermally-assisted magnetic recording head comprising:
a magnetic pole for generating write field from its end on an opposed-to-medium surface side;
a waveguide through which a light for exciting surface plasmon propagates; and
a plasmon antenna comprising: a near-field light generating end for emitting near-field light, reaching the opposed-to-medium surface; and a propagation surface or a propagation edge for causing surface plasmon excited by the light to propagate thereon, extending to said near-field light generating end,
a groove being formed in a side surface of said waveguide, and at least a portion of said propagation surface or said propagation edge being embedded in said groove or being located directly above said groove, said at least a portion being opposed to a wall surface or a bottom surface of said groove with a predetermined distance, so as for the light propagating through said waveguide to be coupled with said plasmon antenna in a surface plasmon mode, and
said recording circuit further comprising a light-emission control circuit for controlling operations of a light source that generates the light for exciting surface plasmon.

* * * * *